Aug. 12, 1958 W. G. BOPP 2,846,899
TRANSMISSION
Filed Feb. 26, 1954 4 Sheets-Sheet 1

INVENTOR:
WARREN G. BOPP
BY
Wilson, Redrow, and Gaines
HIS ATTORNEYS

Aug. 12, 1958     W. G. BOPP     2,846,899

TRANSMISSION

Filed Feb. 26, 1954     4 Sheets-Sheet 3

WARREN G. BOPP,
INVENTOR.

BY Wilson, Redrow,
and Gaines

HIS ATTORNEYS

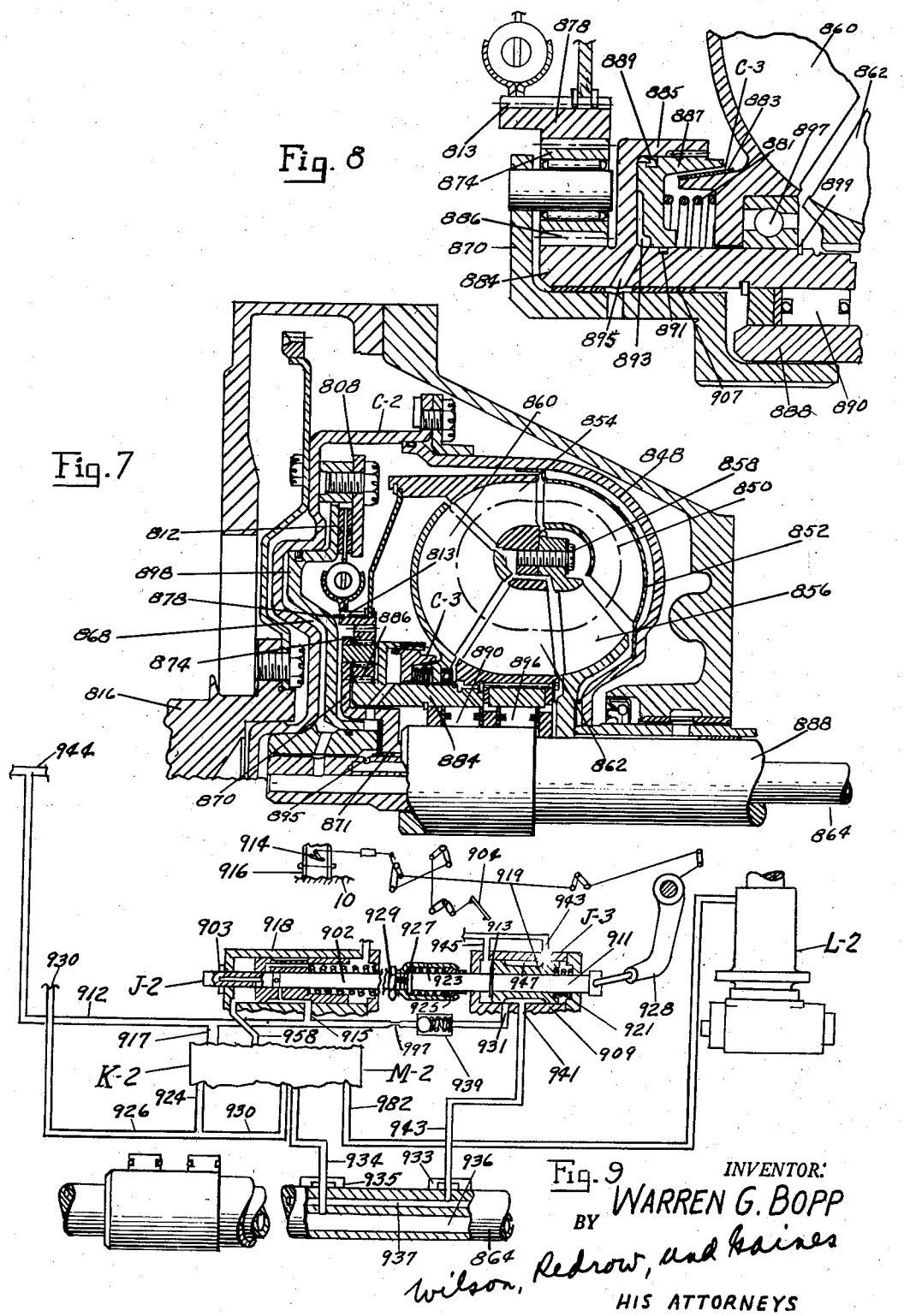

United States Patent Office 2,846,899
Patented Aug. 12, 1958

2,846,899

TRANSMISSION

Warren G. Bopp, Grosse Pointe Woods, Mich., assignor to Studebaker-Packard Corporation, a corporation of Michigan Application February 26, 1954, Serial No. 412,691

17 Claims. (Cl. 74—645)

The present application relates to transmissions for motor vehicles and more particularly to an improved motor and clutch control to be used with a transmission having a torque converter and gearing inherently automatically controlled thereby in such a manner as to insure desirable torque and speed ratio drives for varying conditions of operation. Broadly the invention comprehends the provision of an automatic transmission of the hydromechanical type comprising a pump element, a turbine element which may be a split compounded member, a turbo-stator element, and a strict stator or reactor element, with the turbine and turbo-stator elements in direct association with the gearing of a planetary gear system for the desired automatic controlled output of torque.

In the operation of motor vehicles it is desirable that high torque be available both for starting the vehicle from a standstill and for acceleration whenever needed. It is also desirable that the speed at which the engine is driven be maintained as low as conveniently possible consistent with providing sufficient power for driving the vehicle and for acceleration, thereby to reduce engine wear and engine roar when the vehicle is traveling at higher speeds such as above 50 M. P. H., for example.

An object of the invention herein presented is therefore to provide a transmission having torque converter and gear units combined with a direct drive clutch wherein means responsive to vehicle operating conditions is provided to deliver high torque when needed for starting and accelerating the vehicle and a direct clutch drive is provided for driving the vehicle at relatively higher speeds.

A further object of the invention resides in the provision of an improved engine-driven vehicle transmission adapted to provide high starting torque to a final driven shaft through torque converter and planetary gear units and wherein means under the control of the driver of the vehicle is provided for selectively interrupting the torque increasing function of either or both of the torque converter or planetary gear units to increase the speed ratio of the drive or to provide a direct clutch drive from the engine to the final driven shaft.

Another object of the invention resides in the provision of an improved transmission drive for an accelerator operated vehicle engine wherein a torque converter driven by an engine powered driving shaft may be selectively connected to a final driven shaft through torque increasing or direct drive gearing, and a mechanical clutch bridging over, or at least partially, in parallel with the torque converter may be engaged by means responsive jointly to vehicle speed and the speed increasing position of an accelerator pedal to render the torque converter inoperable or partially so, means being provided to permit the driver to re-engage the torque converter to provide additional converter supplied torque for acceleration whenever needed.

Another object is to provide an output-shaft-driving tandem planetary-converter type of hydro-mechanical transmission having a torque multiplying main or primary turbine in the converter component and a predetermined underdrive gear ratio in the planetary system wherein the overall transmission torque output at static load is the arithmetic product of the torque multiplication factor for the primary turbine and the ratio of the gear system through which the primary turbine transmits its power to the output shaft of the transmission.

Another object of the invention is the provision of a loaded change speed mechanism having a common converter-and-clutch containing housing incorporating a self-controlling, self-contained planetary gear component therein, in which each one of the converter and planetary components has a reaction element that is relatively rotatable with respect to the load but directly coupled, either permanently or disengageably so, to the corresponding element of the other component. Others of the elements in the converter are free of or coupled to the planetary members depending on their function, but all are free of and relatively rotatable with respect to the load. Therefore, the particular state of motion or state of rest which the load alternately assumes has no control over the reaction forces prevailing in the torque converter which is free to adjust itself and seek its most efficient state of operation and performance substantially independently of and in fact largely free from the speed of the load. According to one feature of the invention the referred to reaction element in the planetary component is constituted by a rotatable-reaction sun gear and the reaction element in the converter component is a turbo-stator type secondary turbine.

Another object of the invention is the provision of a planetary converter change speed mechanism between input and output shafts as defined in the preceding object wherein first and second clutches are located within the common housing. In function the secondary turbine in its relation to the fluid transmission amplifies torque inversely with respect to the output torque amplification of the primary turbine such that as the torque amplification of the primary turbine falls off due to changing fluid flow occasioned by increased speed operation of the pump the amplification of the secondary turbine increases, but the overall output torque of the transmission decreases until a predetermined high speed of the output shaft is obtained at which time the transmission transmits substantially a 1:1 straight fluid coupling ratio between the input and output shafts. In function the first clutch, forming the kickdown control, provides the noted direct coupling between the sun gear and the secondary turbine and the second clutch is normally engaged between two other elements in the planetary-converter mechanism and operates independently of the kickdown condition.

A further object of the invention is the provision of a hydro-mechanical torque converter transmission comprising fluid flow cooperative pump and primary and turbo-stator and reactor members, a power input shaft coupled to the pump member, a loaded output shaft, and a planetary gearing system coupling the turbine members by split drive to the loaded output shaft, said primary turbine being effective through the planetary gear system under static or initial rotational condition of the loaded output shaft to provide a maximum torque output of the transmission as a resultant product of the torque amplification factor for the primary turbine and the ratio of the gear system. The secondary or turbo-stator turbine in its relation to the fluid transmission amplifies torque inversely to the output torque amplification of the primary turbine such that as the torque amplification of the primary turbine falls off due to changing fluid flow occasioned by increased speed operation of the pump, the amplification of the secondary turbine increases but the overall output torque of the transmission decreases until a pre-determined high speed of the output shaft is attained at which time the transmission transmits substantially a 1:1 straight fluid coupling ratio between the input and output shafts.

A yet further object of the invention according to at least one disclosed embodiment thereof is the provision of a hydro-mechanical torque converter transmission as defined in the preceding object having an accelerator kickdown control permitting the maximum gear ratio output of the planetary gear system to occur between the input and output speeds of the transmission so as to overrule the straight or substantially straight fluid coupling operation of the transmission when passing acceleration is needed. According to one feature of this controlled kickdown into a planetary gear reduction drive, the gear change into reduction drive occurs almost simultaneously with movement of the accelerator into kickdown position owing to the provision of a near-instantaneously disengaging hydraulically actuated clutch operating in conjunction with an automatically motion responsive one-way sprag brake. The clutch venting and brake engaging actions represent practically contemporaneous operations requiring no appreciable time overlap or lag as with many conventional hydraulically controlled gear reduction engagements.

Another object is the provision of a hydro-mechanical torque converter transmission as defined in the preceding object having a direct clutch control which when engaged, and in addition to the kickdown control, provides for a split path drive into the two different members of the planetary gear system and permits additional available multiplication ratio at the lower speeds.

Another object in connection with the immediately preceding object is the provision, in a control for an engine and a clutch driven by the engine, of fluid pressure means controlled jointly by the position of the engine control and by the speed of the output member of the clutch to control the operation of the clutch, the said fluid pressure means including a plunger type valve urged in one direction by fluid pressure proportionate to engine power control position and in the opposite direction by fluid pressure proportionate to the speed of rotation of the clutch output member.

Another object is to provide an engine powered, combined clutch and converter housing having a multiple clutch controlled hydro-mechanical change speed transmission therein, in which one of the multiple clutches controls the transmission in accordance with the position of the engine power control and in which another of the multiple clutches controls the transmission in accordance with the difference between proportionate pressures dedependent upon the engine power control position and the speed of rotation of the clutch output member jointly.

Further features, objects and advantages will either be specifically pointed out or become apparent when for a better understanding of the invention reference is made to the following written description taken in conjunction with the accompanying drawings in which—

Figure 4 is a graph of curves illustrating the operational behavior of the transmission in Figure 1;

Figures 7 and 8 are corresponding fragmentary longitudinal sectional views of a modified form of converter and planetary component shown to different scales; and Figure 9 is a schematic view of a pressure actuated control arrangement for the modification of Figures 7 and 8.

Figure 1:
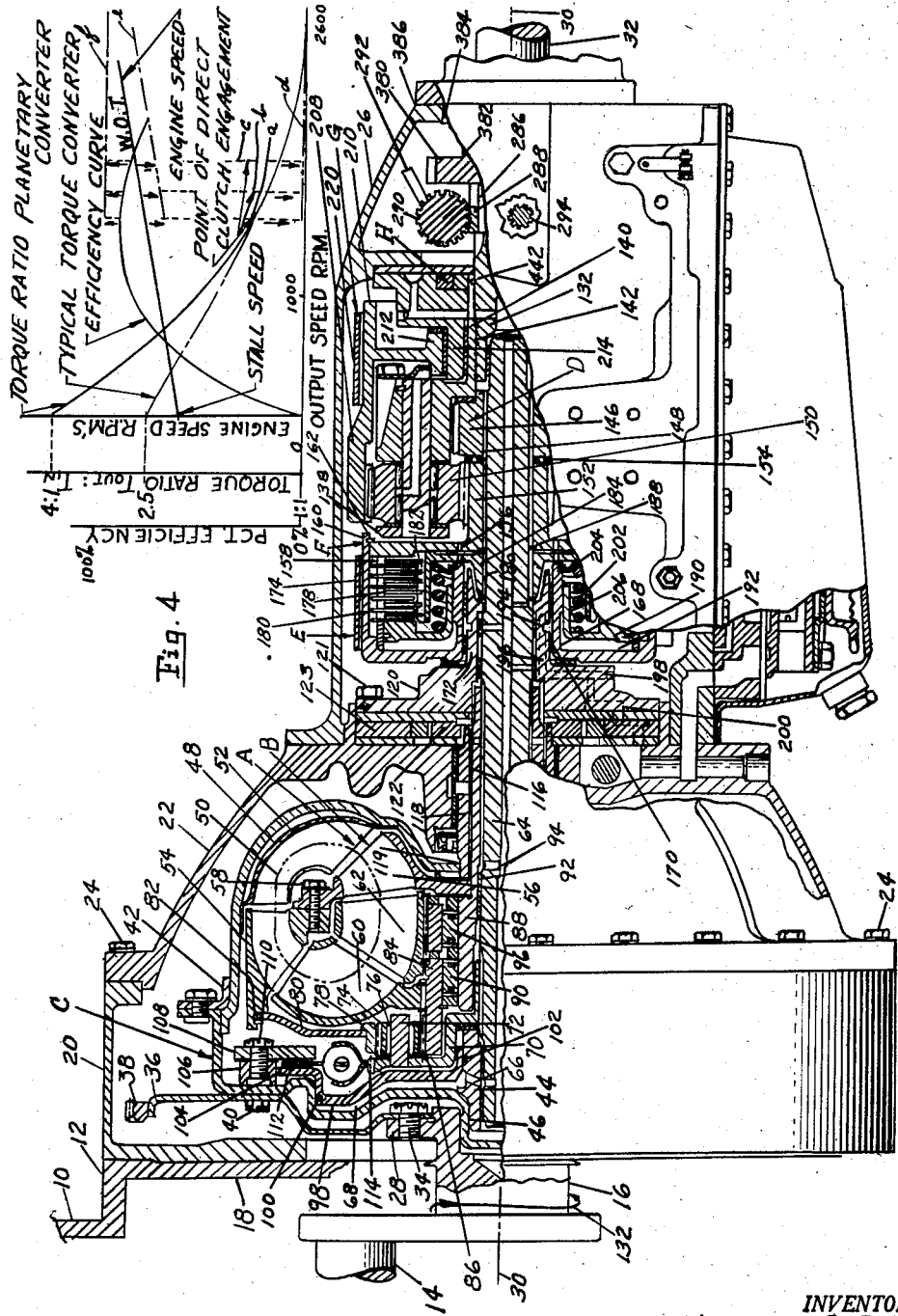
Figure 1 is a longitudinal side elevation of a hydro-mechanical torque converter transmission having certain hidden parts broken out for the sake of clarity.
Figure 2:
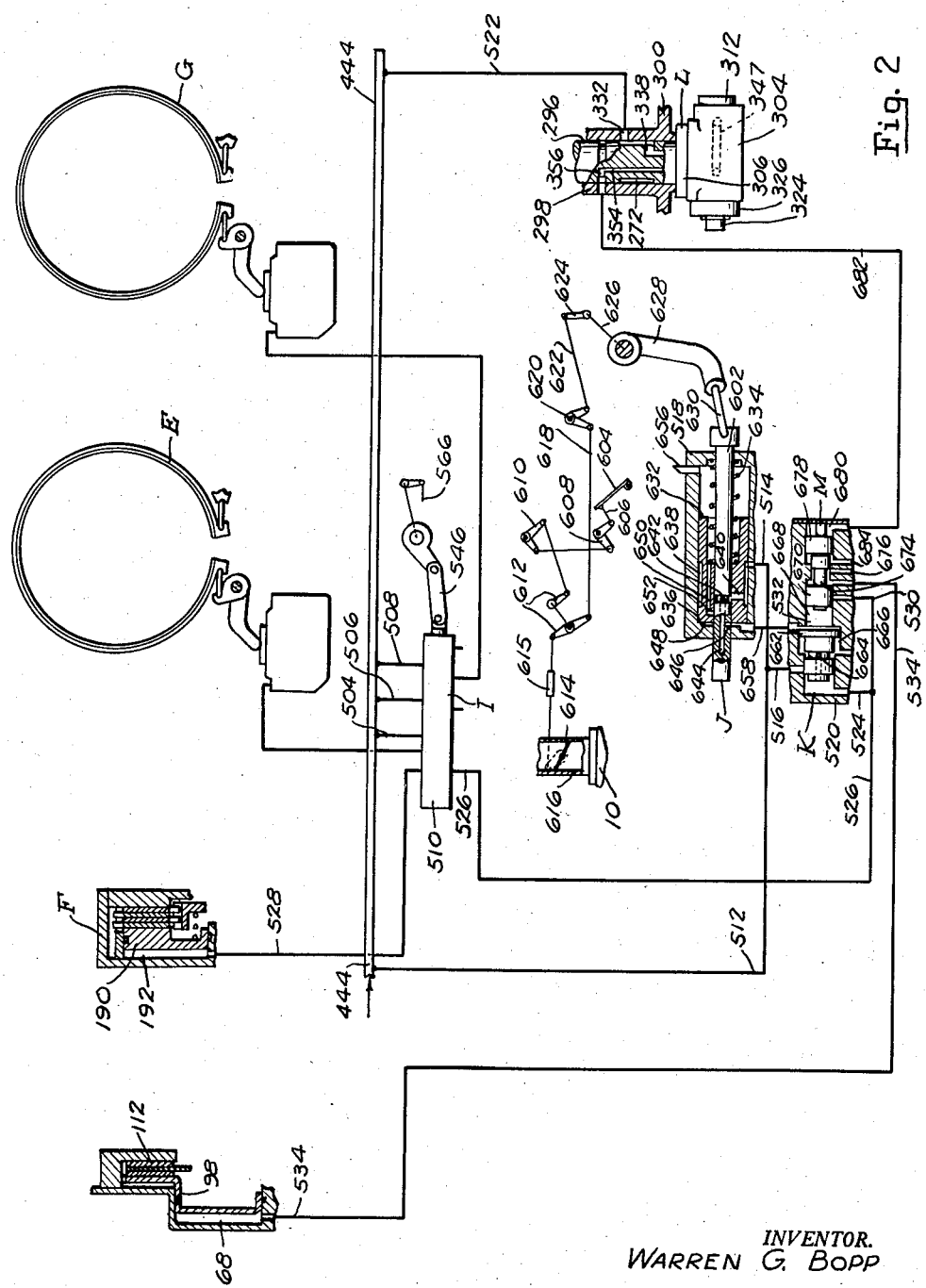
Figure 2 is a schematic diagram of the pressure operated control arrangement for the converter and planetary transmission of Figure 1.
Figure 3:
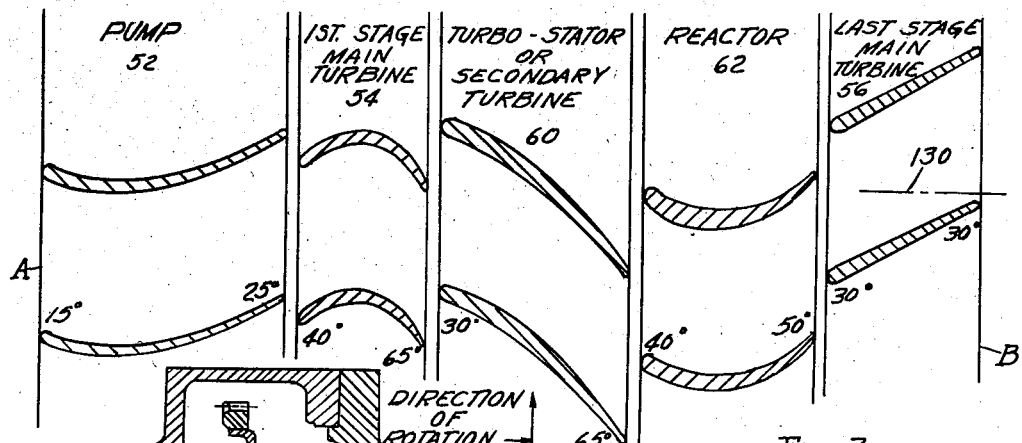
Figure 3 is an unfolded developed view of the blading of the torque converter of Figure 1 looking radially outwardly and taken along the mean path of fluid circulation therein.

In Figures 1, 2, and 3 of the drawings a motor vehicle engine 10 is shown having a block 12 in which an engine crank shaft 14 is set to rotate to form a power input or driving shaft 16. The block 12 has a radially inwardly extending attaching flange 18 to which a three-piece sectional transmission case is bolted comprising a near section 20 of cylindrical shape, a tapered intermediate section 22 bolted at 24 to the section 20, and a remote beveled cylindrical section 26 which is bolted to the intermediate section 22. The power input shaft 16 has a radially flanged driving portion 28 positioned within the transmission case which, along a common axis 30, is axially aligned with a rear output or driven propeller shaft 32. The driving flange portion 28 on the crank shaft 16 has a plurality of threaded fasteners 34 affixing thereto a starter ring disk 36 provided at its outer circumference with a set of starting gear teeth 38.

To an intermediate portion of the starter gear disk 36 there is secured a combined converter and clutch housing C as by a set of threaded fasteners 40 and having a self-contained, self-controlling planetary converter mechanism therein. The combined converter and clutch housing consists primarily of front and rear stamped major components which are bolted together through the medium of a minor ring component 42 and the front one of which receives a hub sleeve minor component 44 which is pressed in an end of the hub portion 46 thereof.

A converter component generally indicated at 48 within the combined converter and clutch housing C includes fluid flow means arranged to circulate converter fluid counterclockwise along a mean path of circulation indicated at 50 in Figure 1 and comprising a vaned pump element 52, a compound split primary turbine element 54 having a separate or auxiliary last stage incorporating a set of vanes indicated at 56 and bolted thereto at 58 for conjoint movement therewith, a set of reactor guide vanes forming a turbo-stator or secondary turbine element 60, and a set of guide vanes forming a reactor element 62. The pump element 52 just noted is connected for conjoint rotation with the drive-shaft-driven combined converter and clutch housing C.

Certain of the remaining elements of the converter 48 are connected to different ones of the members of a planetary gear component so as to provide a split path drive in a longitudinally drilled intermediate shaft 64 serving as a power output shaft from the planetary gearing and as a rear input shaft connected to the rear output shaft 32 in a manner hereinafter described. The intermediate shaft 64 is piloted at its forward end in suitable sleeve bearings shown mounted within the hub sleeve 44 and has the longitudinally drilled internal pressure fluid passage thereof connected by appropriate series-connected passages 66 so as to supply pressure fluid to a clutch chamber 68.

A pinion carrier or output member 70 in the planetary gear set is made rotatably fast at the hub thereof to the intermediate shaft 64 by means of an appropriate set of splines. The carrier 70 carries a plurality, preferably three, of rigid planet pins or shafts 72 which mount a corresponding number of planet pinions 74 for orbital relatively rotatable movement on sets of needle bearings 76. Each of the pinions 74 toward the outer periphery of the carrier 70 meshes with a planetary ring gear or annulus 78 welded to a web 80 connecting the same in rotatably fast relation to the primary turbine element 54 in the torque converter and held against axial movement as by a snap ring 82.

A rotatable sleeve 84 adjacent the hub of the converter 48 is provided at its outer periphery with a set of splines common to the turbo-stator element 60 and to the planetary pinions 74 at their inner side so as to provide a splined engagement with the former and so as to mesh with the latter in the manner of a reaction member or sun gear 86 in the planetary gear set. The rotatable sleeve 84 adjacent the hub of the converter 48 is mounted on and engageable with a hollow stationary shaft 88 as by means of a set of one-way sprag or brake elements 90 and an adjacent bearing. The hollow stationary shaft 88 internally receives a sleeve bearing 92 in which the intermediate shaft 64 is journaled.

A transversely extending side passage 94 leads from the internal passage within the intermediate shaft 64 and lubricates the sleeve bearing 92 in known manner. A set of sprag elements 96 morms another one-way brake between the hollow stationary shaft 88 and a sleeve to which the converter reaction element 62 is appropriately splined. The inner set of vanes 56 of the primary turbine 54 has a radially inwardly directed hub which is piloted on the stationary hollow shaft 88 and the vanes 56 are disposed at the minimum radius of fluid flow in the converter as opposed to the diametrically oppositely spaced primary or main turbine element 54 which is at the maximum radius of fluid flow in the converter.

By reason of the diametrically opposed relationship just noted the vanes 54 and 56 are separated at one side by the turbo-stator and reactor elements 60, 62 in the converter and separated at the other side by means of the pump element 52 in the converter. The internally passaged intermediate shaft 64 is supplied with pressure fluid so as to pressurize the clutch chamber 68 and cause rearward movement of a pressed metal movable clutch piston 98 which carries an O ring type seal 100 at the periphery of the clutch chamber 68. The piston 98 is centrally sealed at 102 to the hub sleeve 44 and is axially slidable with respect thereto during engagement and disengagement of the clutch. At its outer periphery the clutch piston 98 has a plurality of sets of opposed fingers 104 which straddle companion bosses as at 106 that are welded at circumferentially spaced intervals within the front major component of the combined converter and clutch housing C. Accordingly the clutch piston 98 is rendered rotatably fixed to the combined converter and clutch housing C as is a clutch reaction ring 108 disposed in spaced apart opposition to the outer periphery of the clutch piston 98 and secured to the bosses 106 as by a plurality of screw fasteners 110.

Between the opposed surfaces of the clutch piston 98 and the clutch ring 108 a clutch disk 112 is disengageably clamped due to clutch operation and the latter has a spring loaded web and hub internally splined as at 114 and thereby affixed to the splined outer periphery of the planetary gear carrier 70. When the clutch disk 112 is clamped into its engaged position the combined converter and clutch housing C is coupled directly to the power output shaft 64 through the medium of the clutch disk 112, the splines 114, and the carrier 70 which is splined to the power output shaft 64, as previously noted.

A stationary member 120 which forms one wall of a pump housing is secured as by a plurality of screw fasteners 121 to the rear side of the intermediate section 22 of the transmission case. The rear end of the hollow sleeve shaft 88 is stationarily held within the hub of the member 120 by means of a set of splines. The stationary hollow shaft 88 is surrounded by a sleeve bearing 116 on which a pump-element-connected drive sleeve 118 is journaled to rotate, for driving the drive rotor 122 of a forwardly located rotary pressure fluid pump 123. The drive sleeve 118 is connected at one end by splines to the pump rotor 122 and is connected at the other end as by welding at 119 to an inwardly directed flange on the web of the pump element component of the combined converter and clutch housing C. Any movement of the crank shaft 16 is accompanied therefore by a like movement of the drive rotor or impeller 122 of the pressure fluid supplying front pump 123.

The arrangement of the vaned elements in the converter component 48 is best seen in Figure 3 which represents a developed view taken along the mean path of fluid flow 50 and looking radially outwardly beginning along an initial conical plane A shown in Figure 1 and ending with a conical plane of termination B indicated in Figure 1. The direction of rotation and the direction of the fluid flow according to Figure 3 are respectively upwardly and to the right.

The following is given as an example of the relative angles of attack and discharge angles of the vanes with like illustrative values being shown in Figure 3, all of which when appropriately extended are given with respect to an arbitrary longitudinally extending reference line indicated at 130 in Figure 3.

| | Angle of Attack, degrees | Angle of Discharge, degrees |
|---|---|---|
| Pump element 52 | 15 | 25 |
| Main Turbine 54 | 40 | 65 |
| Turbo-stator element 60 | 30 | 65 |
| Reactor element 62 | 40 | 50 |
| Last stage main turbine 56 | 30 | 30 |

The turbo-stator and reactor elements 60, 62 in the torque converter component 48 are independently carried by the common brake-supporting stationary shaft 88 and through the action of the independently acting sets of sprag elements 90, 96 function in conventional reaction vane fashion to aid in torque multiplication during low speed high slip drive of the five-element torque converter 48 under static conditions of the power output shaft 64. The sun gear 86 is directly coupled by the common set of splines to the turbo-stator element 60 in the converter and of course rotates in like manner therewith. On initial acceleration through the torque converter 48, the pump element 52 is rotated in a clockwise direction, when viewed from the front, due to a similar clockwise direction of rotation indicated at 132 for the engine crank shaft 16. The shaping of the blades of the respective pump 52, first stage of the main turbine 54, turbo-stator 60, the reactor 62, and the last stage 56 of the main turbine of the converter component of Figure 3 is such as to direct the converter fluid against the temporarily stationary blades of the turbo-stator and reactor elements 60, 62 in a manner as to tend to rotate at least the latter element and maybe both said elements in a reverse or counterclockwise direction. Under ideal design conditions, however, the turbo-stator element 60 will have neither a negative or positive fluid imposed torque thereon and would be hydraulically balanced so as to tend to remain stationary but for the gear reaction against the teeth of the sun gear 86 to which it is splined; ideally therefore, the fluid imposed dynamic forces will tend only to rotate the reactor 62 in a reverse direction. Due to the one-way braking effect at 90, 96 between the elements 60, 62 and the hollow shaft 88 held stationary by the transmission case at 121, the turbo-stator and sun members 60, 86 and the reactor 62 are locked against reverse rotation and a reaction effect is produced which multiplies the torque transmitted by the main turbine 54 of the converter component which is rotatably affixed to the ring gear 78 in the planetary component. This torque multiplication greatly enhances the accelerating power necessary for starting drive or for increasing the speed of the load on the power output shaft 64. In addition to this multiplication advantage in the torque converter an additional torque multiplication occurs in the planetary gear component in that the ring gear 78 drives the planet pinions and the carrier at a reduced speed, torque multiplying ratio about the stationary sun gear 86.

The following is given as an example of the relative multiplication ratios involved in this invention:

Torque converter ratio_____ 2.5:1
Planetary gearing ratio_____ 1.6:1
Product of ratios 1.6×2.5=4.0:1 ratio overall.

During the major portion of the converter torque multiplication period the turbo-stator and reactor elements 60, 62 are locked up against reverse rotation and are in a stationary position. As the load shaft 64 is set in motion and its speed increases, the speeds of the pump and main turbine elements 50, 54 will tend to attain substantially the same value. As the speeds of these elements approach the same value, the turbo-stator element 60 tends to be driven forwardly and in sequence the reaction forces directed against the blades of the reactor or guide element 62 gradually disappear and the impelled fluid within the converter component begins to drive one element and then both elements in sequence forwardly in a clockwise direction. When the pump, turbine, turbo-stator, and reactor elements 52, 54, 60, 62 are all rotating under torque in the same direction at substantially the same speed, the converter component 48 functions as a simple fluid coupling of substantially 1:1 ratio and the converter torque multiplying phase or period has terminated.

The following is given as an example of the relative load shaft speeds at which the turbo-stator and reactor elements 60, 62 begin to be driven forwardly. The brake 90 releases and the fluid thrust from the turbo-stator 60 overcomes the reaction load on the sun gear 86 and begins to drive it forwardly at 1100 R. P. M. load shaft speed. The one-way brake 96 releases and the reactor or guide element 62 begins to move forwardly at 2400 R. P. M. load shaft speed.

The direct clutch 112 is pressure responsive due to the pressure in the clutch chamber 68 and operates to lock out the torque converter and planetary operation as dictated by the pressures which are predetermined in a manner hereinafter more fully set forth. Dependent therefore on the variable clutch actuating pressure, the point of direct clutch engagement and other phases of the performance of the transmission thus far described are brought out in the accompanying family of curves represented on the graph of Figure 4.

In Figure 4, there appear a dotted line curve labeled Typical Torque Converter, a solid line curve which slopes downwardly and concavely to the right labeled Torque Ratio Planetary Converter, a straight solid line curve labeled Engine Speed, and an upwardly and convexly rightwardly extending solid line curve labeled Efficiency Curve, all plotted against Output Speed of the intermediate shaft 64 in revolutions per minute. In connection with the solid line Torque Ratio Planetary Converter curve it will be noted that at zero R. P. M. output speed the illustrative torque ratio is 4:1, representing the arithmetic product of the typical torque converter ratio of 2.5:1 and the planetary gear ratio of 1.6:1. The Torque Ratio Planetary Converter curve more nearly approaches the dotted line curve of the Typical Torque Converter at the relatively higher speeds past 1000 R. P. M. owing to the decrease of the former in effective ratio employed through the planetary gearing. At the respective points of direct clutch engagement indicated at *a*, *b*, and *c* the planetary output carrier 70 and the power output shaft 64 are relatively abruptly frictionally coupled to the input shaft 16 and a substantially flat 1:1 torque ratio curve indicated in dotted lines at *d* prevails. Under these circumstances the converter and planetary operations are locked out of the drive. The gain in torque multiplication at the relatively lower speeds is indicated as between the solid line Torque Ratio Planetary Converter curve and the dotted line Typical Torque Converter curve. The straight solid line Engine Speed curve is seen in Figure 4 to be inclined upwardly from a zero output or stall speed point to the positions in the areas of the direct clutch engagement at *a*, *b*, *c* at which point of relatively abruptly installed frictional drive the engine speed drops vertically downwardly to a slightly lower but parallel dotted line engine speed curve indicated at *e*. The upwardly and convexly rightwardly extending Efficiency curve originates at a zero point at zero output speed and gradually flattens out in the upper speed ranges to the position of direct clutch engagement at *a*, *b*, or *c*. Thereupon the efficiency of the mechanism rises substantially straight upwardly to a dotted line horizontal efficiency curve *f* which approaches the ideal or 100% efficiency level.

Prior to point of direct clutch engagement the self-contained, self-controlling converter and planetary components within the combined converter and clutch housing C operate without any external stimulus and yield an automatically adjusting torque multiplication advantage of approximately 4:1 or even higher in certain other physical applications of the present principles herein disclosed. This automatic or self-controlling operation is particularly advantageous, being readily adjustable to minor changes in load or speed without any lurches or abruptness of clutch and brake band engagement as with conventional arrangements. The point of direct clutch engagement at *a*, *b*, or *c*, however, is a separate and different operation and is somewhat directly felt as are many frictionally engaged drives which are not under any self-controlling, self-contained action as offered by the inherently automatic planetary converter mechanism within the housing C.

Means within the rear case section 26 of the transmission may be provided to connect the rear input and the rear output shafts 64, 32 for forwardly and reverse drive.

Illustrative of one example of such forward and reversely driving means is a reversible planetary gear mechanism D shown in association with a set of parts E, F, G, H, I, J, K, L, and M in Figures 1 and 2. The planetary mechanism D and the just enumerated associated parts form no per se part of the present invention and are separately shown and described in a co-pending application of Forest R. McFarland, Serial No. 171,690, now Patent No. 2,689,029, assigned to the assignee of the present application. For the sake of ready reference, however, a description of the function and structure of the mechanism D and its associated parts, complete at least to the following extent, is presented as a matter of convenience at this point.

Fluid under pressure to act through the centrally passaged intermediate shaft 64 to actuate the clutch 112 and various clutch and brake members E, F, and G respectively may be supplied by the engine-driven front fluid pump 123 having the impeller 122 thereof operably connected through splines with the sleeve 118 which is welded as at 119 to the inwardly directed flange on the web of the pump element 52 in the torque converter.

The planetary gear train D has a pinion carrier 138 including a hub 140 secured to the rear output or driven propeller shaft 32 in any convenient manner such as by brazing or welding illustrated at 142. A plurality of equally spaced long pinion gears, not shown, are rotatably mounted in the carrier 138 and each meshes with a driving sun gear 146 secured to the intermediate shaft 64 as by a set of splines 148. The long pinion gears just referred to mesh with and drive a plurality of equally spaced short pinions 150 journaled in the carrier 158 and meshing with a controlling sun gear 152 rotatably mounted with respect to the intermediate shaft 64. The controlling sun gear 152 is of smaller diameter than the driving sun gear 146 secured to the intermediate shaft 64. A thrust bearing 154 may be interposed between the driving sun gear 146 and controlling sun gear 152 to maintain the gears in desired axial alignment and to facilitate friction-free rotation of the gears relative to each other. The controlling sun gear 152 may be locked against rotation by a low range brake E to transmit power through the planetary gear train D at reduced speed accompanied by a corresponding increase in torque characteristics of the gear operation of the vehicle. The controlling sun gear 152 is provided with a radially extending flange 156 having outer extremities splined to engage a set of corresponding splines 158 in a drum 160, a snap ring 162 being provided to limit rearward axial movement of the flange 156 in the drum 160. The drum 160 is provided with a hub 168 rotatably mounted on a bushing 170 positioned on an axially extending portion 172 of the stationary member 120. A brake band 174 is provided to engage the drum 160 to lock the controlling sun gear 152 against rotation. When the controlling sun gear 152 is thus locked against rotation, the intermediate shaft 64 and the driving sun gear 146 fixed thereto drive the long pinion gears meshing with the short pinions 150 to rotate them around the stationary controlling sun gear 152 to drive the carrier 138 and the final driven shaft 32 in the same direction of rotation as the intermediate shaft 64 but at reduced speed accompanied by a corresponding increase in torque. The speed reduction and increase in torque are of course dependent upon the ratio of the diameter of the driving sun gear 146 to the controlling sun gear 152. The controlling sun gear 152 may be clutched to the intermediate shaft 64 by the high range clutch F to rotate in unison with the intermediate shaft 64 and the driving sun gear 146 to lock up the planetary unit D to transmit power therethrough at a 1:1 speed ratio with no increase of torque other than the torque increase provided by the planetary-converter components within the combined converter and clutch housing C. The high range clutch F is provided with a plurality of driving disks 178 having notched inner edges to engage a set of splines 182 formed in a hub 184 secured to the intermediate shaft 64 as by a set of splines 186. A plurality of driven disks 180 alternately spaced with reference to the driving disks 178 has notched outer surfaces to engage the splines 158 in the drum 160 splined to the flange 156 of the controlling sun gear 152. A pair of opposed snap rings 188 on opposite sides of the hub 184 prevents it from shifting axially in either direction on the intermediate shaft 64. The clutch F may be engaged by fluid pressure exerted on a ring type piston 190 slidably mounted in a cylinder 192, fluid under pressure being supplied to the cylinder 192 through a set of series connected passages 194, 196, 198 and 200 from a control valve mechanism illustrated diagrammatically by a line 528 interconnecting the cylinder 192 with the cylinder of selector valve I. A spring 202 interposed between an abutment 204 secured to the hub 168 and a hub portion 206 of the piston 190 may be employed to yieldingly urge the piston 190 to the clutch disengaging position.

The rear output or driven propeller shaft 32 may be rotated in the reverse direction by means of the reverse drive brake G. A ring gear 208 meshing with the short pinions 150 is provided with a drum 210 secured to a hub 212 rotatably mounted on a stationary member 214 secured to the housing section 26 as by a set of screws, not shown. A brake band 220 is provided to lock the drum 210 and the ring gear 208 against rotation whereupon the rear output shaft 32 is rotated in the reverse direction as power applied to the driving sun gear 146 rotates the long pinion gears so as to roll the short pinions 150 backwardly in the ring gear 208 to drive the carrier 138 and rear output shaft 32 in the reverse direction. The rear output shaft 32 is formed with a set of splines 286 to receive a gear 288.

As illustrated in Figure 1 the gear 288 drives a gear 290 connected to drive a speedometer through a flexible connector 292. The gear 288 also drives a gear 294 for the governor L. The gear 294 of the governor L is secured to a rotatable shaft member 296, Figure 2, journaled in a shaft housing 298 having a flange 300. A hollow governor case 304 is secured to a flange 306 of the rotatable member 296. The shaft housing 298 surrounding the rotatable shaft 296 is provided with a fluid inlet port 332 which communicates through a set of interconnected inlet passages 272, 338 with the interior of the hollow governor case 304.

In barest essentials, the governor L is seen in Figure 2 to have a first and a second centrifugally actuated valve element both of which are respectively indicated at 312, 324 and are slidably mounted within the hollow interior of the governor case 304, with the first element 312 being received at one end of the case in a bore controlled thereby at that end and the second of the elements being received at the opposite end of the case 304 in a corresponding bore controlled thereby at that end.

In function the first valve element 312 is a modulating valve and has a shoulder-forming, enlarged inner end which is spring urged outwardly and kept in hydrostatic balance owing to the exposure of the shoulder of the enlarged end of the element to the modulating pressure created thereby internally of the case and opposing the spring urged action and the centrifugal force acting on the mass of the modulating valve element 312.

In function the second valve element or plunger 324 is a shut-off valve which is spring urged inwardly into shutoff position in well known manner and which is provided at its outer end with a snap-ring-connected weight 326 to supplement the mass of the second valve element 324 and cause the valve positively to open at a predetermined low speed.

The following is given as an example of the identical relative speeds of opening and closing of the shutoff valve 324: opening speed—12 M. P. H. of the vehicle, closing speed—12 M. P. H. of the vehicle on deceleration.

A longitudinally extending passage 347 formed within the governor case 304 interconnects the oppositely disposed valve controlled bores which receive the respective valve elements 312, 324; the inlet end of the passage 347 which is adjacent the modulating valve element 312 is supplied with modulated pressure therefrom and the outlet end of the passage 347 which is adjacent the shutoff valve element 324 is effectively open or closed dependent upon the corresponding position of the latter valve element. The valve controlled outlet of the passage 347 adjacent the valve element 324 communicates with an outlet 356 in the shaft housing 298 through appropriate connections including an interconnecting passage 354. The modulating valve element 312 is urged radially outwardly in its bore within the governor case 304 to increase communication between the inlet passage 338 and the adjacent internal bore receiving the element 312 within the governor case as the centrifugal forces are created and act on the element 312 owing to rotation of the governor case 304 about the axis of the rotatable shaft 296. Outward movement of the modulating valve element 312 is hydrostatically opposed by fluid pressure corresponding to modulated pressure and exerted on the aforementioned shoulder of enlargement of the element 312 all as more fully set forth in the noted co-pending application of Forest R. McFarland, Serial No. 171,690.

As shown in Figure 1 the rear output shaft 32 is provided with a parking gear 380 having a hub 382 engaging the splines 286 thereon, the hub 382 being journaled in a bearing 384 mounted in the rear closure 386 of the rear section 26 of the transmission case.

In reference more specifically now to Figure 2 it will be noted that the clutch F and the brakes E and G are actuated by fluid pressure supplied under certain circumstances by the front pump 123 and under other circumstances by a rear pump H having an impeller 440 secured to the rear output shaft 32 in any convenient manner as by a plurality of driving balls 442 for instance. The outlet passages from the front and rear pumps 123 and H communicate line pressure to a common fluid pressure supply gallery or header 444 provided with one or more relief valves set at pre-determined pressures as appropriate. For example a relief-valve limited pressure of 80 lbs. per square inch gauge may desirably be maintained in the manifold or header 444 to serve as line pressure. The line pressure supply gallery 444 has a plurality of spaced apart conduits 504, 506, 508 communicating with a cylinder 510 of the selector valve I which is shown in block form. The line pressure supply gallery 444 has an additional conduit 512 communicating through appropriate branch conduits 514, 516 respectively with the cylinder 518 of the throttle governing valve J and with a cylinder 520 of the clutch modulating valve K. The line pressure gallery 444 also has a conduit 522 communicating with the inlet port 332 of the governor L driven by the rear output shaft 32. The cylinder 520 of the clutch modulating valve K has an outlet port 524 communicating through a conduit 526 with the cylinder 510 of the selector valve I and through the selector valve I communicates with an aligned conduit 528 leading to a clutch operating cylinder 192 in the high range clutch F to actuate a ring type piston 190 therein so as to engage the high range clutch F of the planetary gearing D. The conduit 526 connected through the outlet port 524 with the cylinder 520 of the clutch modulating valve K is connected through a conduit 530 with the cylinder 532 of a direct drive shift valve M having another conduit 534 communicating with the clutch operating cylinder 68 of the direct clutch 112 to actuate the pressed steel piston 98 to engage the clutch disk 112 thereby rendering the torque converter and planetary components within the combined housing C inoperable except as a fly wheel.

The cylinder 510 of the selector valve I has various connections to the low range brake E and to the reverse drive brake G as well as to the high range clutch F and operates in the manner more fully described in the noted co-pending application Serial No. 171,690, McFarland. The valve I is operated through a series of connected links 546, 566 so as to be operated manually from a remote position in access to the driver's seat of the vehicle. Thus various forward and reverse gear ratios are made available through the planetary gear component and also a direct drive ratio in 1:1 relationship is made available upon engagement of the high range clutch F.

The throttle governing valve J has a plunger 602 slidably mounted in the cylinder 518 and actuated to move rearwardly therein in response to speed increasing movement of an accelerator pedal 604 mounted at a remote position in access to the driver's compartment of the vehicle. The accelerator pedal 604 is connected through a rod 606 and a series of interconnected bell cranks 608, 610, 612 to the throttle valve 614 mounted in the induction manifold 616 of the vehicle engine 10.

A spring-loaded telescopically acting lost motion connection 615 of the type hereinafter described in connection with the last disclosed embodiment of the present invention, may be included in the pull-rod interconnection shown between the bell-crank 612 and the throttle valve 614. The bell-crank 612 is connected through a rod 618 and a bell crank 620 to a rod 622 operably connected to a lever 624 secured to a shaft 626 having a lever 628 secured thereto and operably connected to the plunger 602 through a link 630 to shift the plunger rearwardly as the accelerator pedal 604 is moved in the throttle opening direction. The accelerator pedal linkage and the plunger 602 have an overtravel postion past the fully open position of the throttle valve 614, the over travel being appropriately accommodated by the spring loaded lost motion connection 615 when extended.

A movable sleeve 632 is interposed between the cylinder 518 and the plunger 602 and is yieldingly urged by a spring 634 toward a fixed abutment 636. The sleeve 632 has an elongated annular groove 638 communicating with the branch conduit 514 which receives fluid under line pressure from the supply gallery 444 through the conduit 512. The sleeve 632 has a radial port 640 adapted to align under certain conditions of operation with a cross bore 642 located in the floor of an annular circumferentially extending groove formed in the plunger 602 and communicating with a longitudinal bore 644 in the plunger. The plunger 602 has another cross bore 646 positioned to admit fluid to a chamber 648 in the cylinder 518 forwardly of the sleeve 632.

As the accelerator pedal 604 is moved in the speed increasing direction the throttle valve 614 opens from its meager open or engine idling position and the plunger 602 moves rearwardly in the cylinder 518 thereby increasing communication between the radial port 640 in the sleeve 632 and the cross bore 642 in the plunger 602. Fluid under line pressure from the gallery 444 then flows through the aligned passages to the chamber 648 thereby increasing the pressure exerted on the forward end of the sleeve 632 shifts on the plunger 602 until a point of equilibrium is reached between the force exerted by the spring resistance of the spring 634 thereby decreasing communication between the port 640 and the cross bore 642. The sleeve 632 shifts on the plunger 602 until a point of equilibrium is reached between the force exerted by the spring 634 urging it outwardly into fluid pressure exerted in the chamber 648 urging it rearwardly.

As the plunger 603 is moved by actuation of the accelerator pedal 604 the sleeve 632 moves with it with substantially no time lag. The pressure exerted in the chamber 648 is thus substantially proportioned to the position of the accelerator pedal 604. The sleeve 632 of the throttle governor valve J is provided with an interconnected radio passage 652 and an internal annular groove 650 open to atmosphere through a port 656. When the plunger 602 is moved forwardly from any rearward position by throttle closing movement of the accelerator pedal 604 or toward the engine idling position, fluid trapped in the chamber 648 can flow through the cross bore 646 in the plunger 602 thence axially in the longitudinal bore 644 and out the cross bore 642 into the circumferential groove in the plunger 602 but lines up with the inner groove 652 in the sleeve 632. As the plunger 602 moves forwardly by throttle closing movement of the accelerator pedal 604, the chamber 648 is vented until the inner groove 652 of the sleeve 632 has aligned itself with the groove adjacent the cross bore 642 of the plunger 602 thereby cutting off the venting means.

Further forward movement of the plunger 602 by continued movement of the accelerator pedal 604 toward the engine idling position will provide further venting as described. Movement of the plunger 602 by throttle opening movement of the accelerator pedal 604 will again align the groove in the plunger 602 with the radial port 640 in the sleeve 632 thereby permitting line pressure from the gallery 444 to flow through the groove into the chamber 648 thereby again aligning the ports in the sleeve 632 and in the plunger 602 up to the point where pressure in the port 640 is cut off. By this means the sleeve 632 travels with the plunger 602 and at the same time maintains the throttle governed pressure in the chamber 648 directly proportional to the speed increasing position of the accelerator pedal 604. The chamber 648 communicates throttle pressure through a conduit 658 and into a chamber 660 aligned with the cylinder 520 of the clutch modulating valve K but of larger diameter than the cylinder 520. A plunger 662 slidably mounted in the cylinder 520 is thus subjected to increasing fluid pressure proportionate to the speed increasing position of the accelerator pedal 604; that is to say, subjected to throttle governed pressure. The plunger 662 has a cross bore 664 adapted to communicate with a vent passage 666 or with the branch conduit 516 connected through the conduit 512 with the line pressure gallery 444 when the plunger 662 is urged forwardly by throttle governed flow pressure exerted on the rear face of the plunger 662. As fluid flows through the cross bore 664 its pressure is exerted in the cylinder 520 against the front face of the plunger 662 to urge it rearwardly in opposition to the throttle governed pressure exerted in the larger diameter chamber 660. As the plunger 662 moves rearwardly the communication between the branch conduit 516 and the cross bore 664 is reduced thereby decreasing the flow of fluid into the cylinder 520 forwardly of the plunger 662. The pressure exerted in the cylinder 520 forwardly of the plunger 662 and transmitted to the high range clutch F through the conduit 526 is thus modulated in proportion to the speed increasing position of the accelerator pedal 604. Thus the high range clutch F is engaged by fluid pressure proportionate to the speed increasing position of the accelerator pedal. For example, with relatively small speed increasing movement of the accelerator pedal 604 the clutch engaging pressure exerted in the conduit 526 is relatively low to engage the clutch slowly to provide a relatively slow smooth start. With more rapid speed increasing position of the accelerator pedal the clutch engaging pressure exerted in the conduit 526 is higher to accommodate the increased torque exerted by the engine.

The chamber 660 communicates with a chamber 668 of small diameter in the forward end of the cylinder 532 of the direct drive shift valve M. A forward plunger 670 has its forward end subjected to throttle governed fluid pressure in the chamber 668 to urge the plunger rearwardly to close the conduit 530 and to vent the conduit 534 communicating with the direct drive clutch 112 through an annular groove 674 in the plunger 670 and a vent passage 676 in the cylinder 532.

A rear plunger member 678 has its rear end subjected to fluid pressure in a chamber 680 communicating through a conduit 682 with the outlet port 356 of the governor L. A vent passage 684 is provided in the cylinder 532 to permit the escape of any fluid passing the rear section 678 of the plunger 670. The plunger 670 is thus urged rearwardly by throttle governed fluid pressure exerted in the chamber 668 to interrupt communication between the clutch engaging fluid pressure in the branch conduit 530 and the conduit 534 leading to the pressure chamber 68 in the direct drive clutch 112. The plunger 670 is urged forwardly to interconnect the conduits 530 and 534 to engage the direct clutch 112 by fluid pressure from the governor L responsive to the speed of the rear output shaft 32.

The slidable part of the direct shift valve constituted by the plungers 670, 678 is rather direct or abrupt acting in its fluid controlled operation. In one physically constructed embodiment of the broader aspects of the invention here presented, the abruptness of action just noted was further accentuated in accordance with the teachings of the co-pending Carroll J. Lucia application Serial No. 258,771, filed November 28, 1951, now Patent Number 2,728,427 and assigned to the assignee of the present application. The vehicle speed at which the clutch 112 will be engaged is thus dependent on the pressure developed by the governor L and the throttle governed fluid pressure exerted in the chamber 668.

The following is given as an example of the relative range of speeds in the speed increasing direction at which the direct drive clutch 112 is engaged. The lowest speed which corresponds to a minimum position of opening of the throttle past engine idling position is 15 M. P. H. road speed and the highest speed corresponding to a wide open throttle position for acceleration is 55 M. P. H.

Exclusive of the operation for selectively pressurizing and venting the brakes and clutch E, G, F the operation of the planetary reversible gear D is as follows. When the engine 616 is operating at idling speed the front pump C develops the pressure for the pressure supply gallery 444 and this pressure is maintained at approximately 80 lbs. per square inch. Fluid pressure from the gallery 444 is transmitted through the conduit 512 to the cylinder 518 of the throttle governing valve J and flows through the axial groove 638 and radial port 640 in the movable sleeve 632 to the cross bore 642 in the plunger 602 operably connected to the accelerator pedal 604. Fluid then flows through the port 642 and the bore 644 in the plunger 602 and is exerted on the forward face of the sleeve 632 in the chamber 648 to move the sleeve rearwardly against the spring 634 thereby reducing communication between the ports 640 and 642 so as to subject the chamber 648 to a pressure less than line pressure and substantially proportionate to the speed increasing position of the accelerator pedal 604 under all conditions of operation. Fluid pressure from the chamber 648 flows through the conduit 658 to the chamber 660 of the clutch modulating valve K to move the plunger 662 forwardly in the cylinder 520 thereby interconnecting the port 664 in the plunger 662 with the outlet from the branch conduit 516 to admit fluid from the supply gallery 444 to the cylinder 520 forwardly of the plunger 662. This pressure urges the plunger 662 rearwardly in the cylinder thereby reducing communication between the port 664 and the branch conduit 516. The clutch engaging presspure exerted on the fluid in the cylinder 520 of the clutch modulating valve K is thus proportionate to the speed increasing position of the accelerator pedal 604 at all times to vary the rate of engagement of the direct drive clutch 112 and also the high range clutch F substantially in proportion to the speed increasing position of the accelerator pedal 604.

Fluid pressure from the line gallery 444 is also suitably directed to the fluid filled torque converter component 48 through means including a relief valve not here shown but completely shown and described in the noted co-pending McFarland application Serial No. 171,690. A heat exchanger or radiator may also be provided to cool the fluid admitted to or discharged from the torque converter 48.

The conduit 526 communicating with the cylinder 520 of the clutch modulating valve K is connected through an annular groove header within the block-shown selector valve I, with the conduit 528 leading to the high range clutch F to engage said clutch thereby locking the controlling sun gear 152 to the intermediate shaft 64 to lock up the reversible planetary gear train D and transmit power from the intermediate shaft 64 to the rear output shaft 32 at a 1:1 speed ratio. The rate of engagement of the high range clutch F will, under appropriate positioning of the selector valve I, be proportioned to the speed increasing position of the accelerator pedal 604 as previously described. If a time lag intervenes between the time that the selector valve I is shifted to the appropriate high range position and the preceding time at which the accelerator pedal was moved into a speed increasing position, the clutch F will be engaged slowly and will be fully engaged to provide a 1:1 drive ratio through the planetary gear train D at the time at which the accelerator pedal 604 is first depressed. Depression of the accelerator pedal thereafter normally causes the speed of the vehicle to rise and the throttle governed pressure in the chamber 648 of the throttle governor valve J and in the chamber 668 of the direct drive shift valve M increases substantially proportionately to movement of the accelerator pedal 604 in the speed increasing direction. This force urges the plunger 670 of the direct drive shift valve M rearwardly to maintain the plunger 670 in the interrupting position between the conduit 530 from the clutch modulating valve K and the conduit 534 leading to the direct drive clutch 112 interposed between the power input shaft 16 and the power output shaft 64 from the planetary gearing within the combined converter and clutch housing C. The direct drive clutch 112 is thus maintained inoperable until the pressure exerted in the chamber 680 of the direct drive shift valve M from the governor L is sufficient to overcome the throttle governed fluid pressure in the chamber 668.

By way of review of the governor L of Figure 2 it will be noted that the element 312 is spring urged outwardly within its bore in the governor case member 304 so as to internally pressurize the governor case 304 and the passage 347 therein. As the speed of rotation of the rear output shaft 32 increases the element 312 is urged further outwardly thereby admitting additional fluid and increasing the internal pressure within the governor case 304 in proportion to the speed of the rear output shaft 32. On the other hand the weight 326 is spring urged inwardly by a spring having sufficient strength to prevent the weight 326 and an associated valve plunger 324 from shifting outwardly until such time as the rear output shaft is rotated at a speed corresponding approximately to 12 M. P. H. vehicle speed. The vehicle speeds higher than approximately 12 M. P. H., the weight 326 and its associated valve plunger 324 shift outwardly permitting internal fluid pressure within the governor case member 304 to pass internally though the passages 354 and 356 to a conduit 682 and thence to the chamber 680 of the direct drive shift valve M. The pressure exerted in the chamber of the direct drive shift valve M originates in the passage 347 in the interior of the governor case L and is therefore substantially proportionate to the speed of the vehicle as discussed above.

The pressure exerted in the chamber 668 at the opposite end of the direct drive shift valve M is substantially proportional to the speed increasing position of the accelerator pedal 604 as previously described. The vehicle speed at which the direct drive clutch 112 will be engaged to interrupt operation of the torque converter 48 and the associated planetary component thus varies in dependence upon the speed increasing position of the accelerator pedal 604 jointly with the speed at which the vehicle is traveling. At the low engine-speed-positions of the accelerator pedal 604, the clutch 112 will be engaged at a vehicle speed of approximately 15 M. P. H. and at high speed operating positions of the accelerator pedal 604, the clutch 112 will not be engaged until a vehicle speed of approximately 55 M. P. H. has been attained. When the vehicle speed governed pressure exerted in the chamber 680 of the direct drive shift valve M is sufficient to overcome the throttle governed pressure exerted in the chamber 668 the plungers 670 and 678 are shifted forwardly or to the left from the position shown in Figure 2 whereupon the axial groove 674 in the plunger 670 permits fluid to flow from the conduit 530 through the cylinder 532 and into the conduit 534 to engage the direct drive clutch 112 by fluid pressure from the clutch modulating valve K. Torque is then transmitted from the driving shaft 16 through the direct clutch 112 to the intermediate shaft 64 thereby rendering the torque converter 48 and the associated planetary gearing within the housing C inoperable except as a flywheel and providing a 1:1 mechanical drive between the power input shaft 16 and the intermediate shaft 64.

In the event that the selector valve I is so positioned that the high range clutch F of the planetary gear train D is engaged to provide a 1:1 drive through the planetary gear train D, power is transmitted directly from the power input shaft 16 to the rear output shaft 32 at a 1:1 speed ratio thus providing a direct slip free mechanical drive to the rear output shaft 32. In the situation where a prevailing speed ratio of 1:1 is in effect and additional power is required as for example to pass another vehicle, the driver may selectively effectuate either or both the torque increasing function of the converter 48 or the torque increasing function of the planetary gear train D.

To establish the torque increasing function of the planetary gear train D merely involves a manual manipulation of the selector valve I which appropriately vents the high range clutch F and pressurizes the low range brake E as more particularly set forth in the co-pending Forest McFarland application Serial No. 171,690.

To re-engage the torque converter 48 when the clutch 112 is engaged the driver depresses the accelerator pedal 604 in the engine speed increasing direction to a position of overtravel relative to lost motion connected throttle valve 614 and nominally called a kickdown position. As already pointed out the fluid pressure exerted in the chamber 648 of the throttle valve J increases substantially in proportion to the speed increasing position of the accelerator pedal 604. The pressure exerted in the chamber 648 of the throttle governor valve J is of course transmitted through the conduit 658 and is exerted in the chamber 668 of the direct drive shift valve M to urge the plungers 670 and 678 rearwardly in opposition both to the pressure exerted in the chamber 680 on the plunger 678 from the governor L and to the pressure exerted on the exposed rear surface of the plunger 670 created by the clutch engaging pressure fluid from the conduit 530. When the force then exerted on the forward end of the plunger 670 overcomes the force exerted by the speed governed fluid pressure the plungers 670 and 678 rapidly shift rearwardly into the solid line position illustrated in Figure 2. The actuating chamber 68 of the clutch 112 is then vented through the vent passage 676 as shown in solid lines in Figure 2 whereupon the clutch 112 is disengaged and the torque converter 48 is rendered operable to multiply torque and provide the increased power required to accelerate the vehicle for pass-by acceleration. To disengage the clutch 112 thereby re-engaging the torque converter 48, it is necessary to depress the accelerator pedal 604 to the kickdown position beyond the full throttle position. This movement of the accelerator pedal 604 causes the plunger 602 to be retracted and drawn rearwardly in the cylinder 518 whereupon the sleeve 632 also moves rearwardly due to the increase of pressure in the chamber 648 compressing the spring 634 and subjecting the chamber 668 of the direct drive shift valve M to substantially the full line pressure exerted in the fluid supply gallery 444. This pressure overcomes the speed governed pressure exerted on the plunger 678 in the chamber 680 from the governor L into the pressure exerted on the rear exposed face of the plunger 670 from the chamber 520 of the clutch modulating valve K and urges the plungers 670 and 678 rearwardly to disengage the clutch 112 and again render the torque converter 48 operable.

In addition to the kickdown effect produced by overtravel position of the accelerator pedal 604, a kickdown effect whereby the clutch 112 is disengaged is further realized under the following conditions of deceleration of the vehicle. At vehicle speeds of 12 M. P. H. and under, the shutoff valve element 324 in the governor L occupies its closed or shutoff position preventing governor pressure from reaching the line 682 leading into the shift valve M and at the same time venting the line 682. Accordingly, the unopposed residual throttle pressure available in the chamber 668 in the shift valve M is sufficient to move the valves 670 and 678 therein to the rear as shown in solid lines in Figure 2 and vent the conduit 534 through the vent passage 676. Therefore, at speeds of 12 M. P. H. and under the torque converter is automatically rendered operable and the clutch 112 is retained in the disengaged position irrespective of the relative position of the throttle valve J.

The rear pump H is utilized at the relatively higher vehicle speeds to provide pressurization to the line pressure gallery 444 at which time the forward pump 123 is by-passed all as more particularly pointed out in the co-pending McFarland application Serial No. 171,690. Operation of the rear pump H is also important when it becomes necessary to start the vehicle engine 616 by pushing or pulling the vehicle. Thus when the vehicle is pushed or pulled the rear output or driven shaft 32 becomes the driving shaft inasmuch as it is geared directly to the traction wheels of the vehicle. Rotation of the propeller shaft 32 rotates the impeller 440 of the rotary gear pump H to subject the supply gallery 444 to the existing line pressure. When a vehicle speed of approximately 20 to 25 M. P. H. is attained due to pushing or pulling the selector valve F is appropriately manipulated so as to attempt to pressurize the high range clutch F. While the vehicle is being thus moved the accelerator pedal 604 is preferably in the released position but it is depressed somewhat at the time that the selector valve I is manipulated as just noted.

Fluid flows from the line pressure gallery 444 through the conduit 512 to the throttle governing valve J and to the clutch modulating valve K. Fluid flows from the clutch modulating valve K through the conduit 526 and groove 690 in the plunger 544 of the selector valve I so as to engage the high range clutch F thereby locking the controlling sun gear 152 to the intermediate shaft 64 to lock up the reversible planetary gear train D to drive the intermediate shaft 64 at a 1:1 speed ratio with respect to the propeller shaft 32. Fluid under pressure from the line supply gallery 444 is directed through the conduit 522 to the governor L to subject the conduit 682 and the chamber 680 of the direct drive shift valve M to fluid pressure to actuate the plunger 678 and 670 thereby directing fluid under pressure from the clutch modulating valve K through the conduit 534 to the cylinder 104 to engage the clutch 112 thereby rendering the torque converter 48 inoperable except as a fly wheel and providing a direct mechanical drive from the propeller shaft 32 to the crank shaft 16 to crank the engine.

The just noted engagement of the clutch 112 is rather positive and direct acting in its operation the same as the clutch engagement is during the normal driving conditions of acceleration where, as a joint function of throttle governed pressure and speed governed pressure, the clutch 112 is caused to engage so as to lock out the torque converter component 48 and provide a 1:1 drive between the power input shaft 16 and the driven propeller shaft 32. In the case particularly of the latter instance, it may be advantageous to provide a modification in the converter and clutch housing C so as to produce a somewhat softer or smoother clutch engagement.

Figure 5:
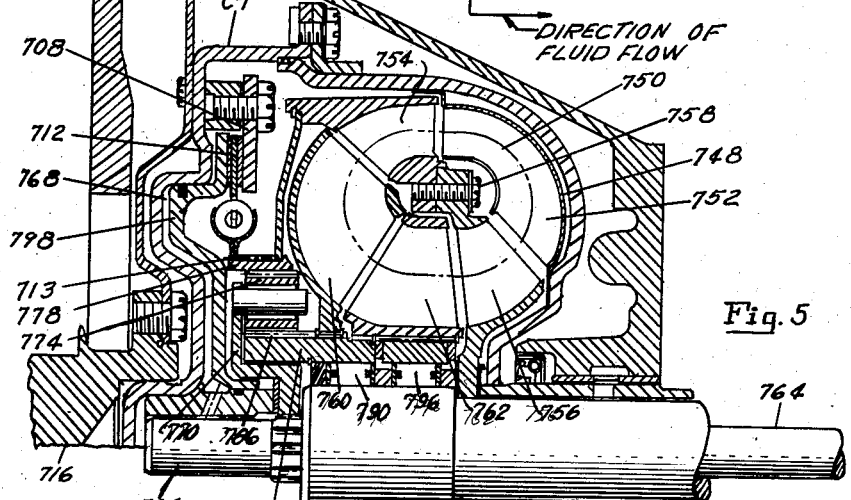
Figure 5 is a fragmentary longitudinal cross sectional view of a modified form of torque converter and planetary component.
Figure 6:
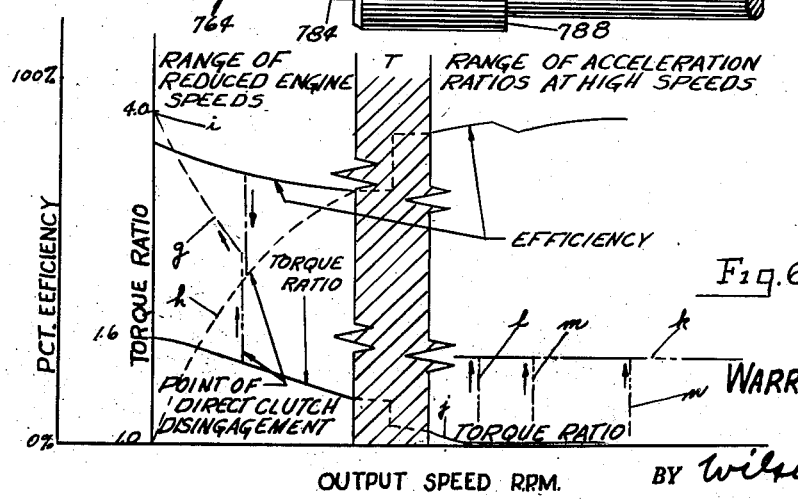
Figure 6 is a graph showing the operational behavior of the modification of Figure 5.

Such modification is shown according to the embodiment of Figures 5 and 6 wherein slightly different but advantageous other features of operation are offered in addition to the softer clutching action. Similarly to the combined converter and clutch housing C of the embodiment of Figure 1, the modification of Figure 5 has a combined converter and clutch housing C–1 wherein a torque converter component 748 comprises a pump element 752, a primary or main turbine element 754, a turbo-stator element 760, and a reactor element 762. The main turbine 754 may be of the split compound type provided with a last stage set of vanes 756 secured as by a set of screws 758 to the first stage of the main turbine 754. Similarly to the principal embodiment of Figure 1, the pump element 752 is directly connected to the power input shaft 716, the turbo-stator element 760 is connected to a sun gear 786 forming one element of a planetary gear component and having a common set of splines by means of which the turbo-stator element 760 is rotatably affixed thereto, and the main turbine element 754 is rotatably affixed to a ring gear or annulus 778 included in the planentary gear component. A set of pin carried planetary pinions 774 meshes with and orbits about the sun gear 786 and the ring gear 778, and is carried by a planetary gear carrier 770 appropriately splined to the intermediate shaft 764 or power output shaft from the planetary. In similarity likewise to the embodiment of Figure 1 a splined sleeve 784 which carries the sun gear teeth 786 is connected by means of a one-way sprag brake 790 to a case connected fixed hollow shaft 788. Another set of one-way sprag brake elements 796 connects the reactor 762 and the stationary shaft 788 in a one-way braking relationship. A direct clutch arrangement includes a clutch friction disk 712 arranged to be clamped between a relatively stationary clutch ring 708 and a clutch piston 798, the piston 798 being pressurized and moved into clamping engagement under the influence of pressure fluid in a pressure chamber 768.

The points of structural similarity between the principal embodiment of Figure 1 and the modification of Figure 5 cease at this point of description and the modification of Figure 5 is different in that the clutch disk 712 has a spring-loaded web and hub which is rotatably affixed at its inner periphery to a common set of splines 713 by means of which the hub of a web connected to the main turbine 754 is connected to the ring gear 778 in the planetary.

Though differing in overall result, the clutch 712 is operated in the same fashion as the direct clutch 112 of Figure 1 and engages at or between the speeds of 15 and 55 M. P. H. as a joint function of throttle governed pressure and speed governed pressure. However, following engagement of the direct clutch 712 the converter fluid in the converter 748 continues to circulate counter-clockwise along the mean path 750 of Figure 5 even though the pump element 752 and the main turbine element 754 are locked against relative rotation with respect to one another. The drive into the planetary gear pinion 774 is therefore a split drive, originated in part through the ring gear 778 and the remainder being fed in a path through the sun gear 786 from the turbo-stator element 760. The latter path constitutes a fluid slip drive connection and therefore a soft engagement at the clutch 712 is experienced as manifested at the time that the torque reaches the intermediate or power output shaft 764.

The following is given as an example of the relative division of torque under the circumstances that on acceleration the clutch 712 is engaged at a vehicle speed of 25 M. P. H. at which time preferably the sun gear 786 starts to rotate. Thereby it results that about 40% of the torque is passed through the converter turbo-stator 760 at a multiplication factor for instance of 2:1 whereas the remaining 60% portion of the torque coming from the power input shaft 716 is fed directly into the ring gear 778 with which the main turbine element 754 and the pump element 752 rotate in unison. A resulting torque multiplication of 1.4:1 is available then even after engagement of the direct clutch 712.

For a fuller understanding of this operation reference may be had to the family of curves appearing on the graph of Figure 6. It will be noted that, as plotted aganist output speed of the intermdiate shaft 764 in R. P. M., the graph is divided into an intermediate cross hatched transition area T wherein direct engagement of the clutch 712 occurs, and a range of Reduced Engine Speeds to the leftward and a range of Acceleration Ratios at high speeds appears at the right of the transition area T. Consistent with the preceding remark about the 40–60 torque split and the resulting multiplication effect realized, it will be noted that in the range of acceleration ratios at high speeds the torque ratio curve still retains a finite value above 1:1 ratio as it emerges from the cross hatched transition area T. As the speed continues to increase however in the range of acceleration ratios at high speed it will be noted that the torque ratio more closely approaches 1:1 at which time it can be assumed that the converter 748 is functioning after the 1:1 slip drive manner of a straight fluid coupling. In this latter instance it will be noted that the Efficiency curve tends to reach a maximum in this range of acceleration ratios at high speeds.

Under circumstances of deceleration according to the graphs of Figure 6, the range of reduced engine speeds shows a solid line torque ratio curve which gradually rises under conditions of deceleration and approaches a torque ratio of 1.6:1, at least up until the time of clutch disengagement of the direct clutch 712. This situation will occur under the common circumstances of hill climbing for instance under which the vehicle speed will gradually reduce. The reaction effect on the sun gear 786 will increase to a point that the turbo-stator element 760 gradually decreases in speed and has difficulty driving the sun gear forwardly. Though the situation never occurs perhaps where the sun gear completely stops under these hill climbing circumstances the reduced speed of the sun gear permits a gear ratio multiplication through the planetary gear component which tends to approach the planetary multiplication of 1.6:1. In such instance in this range of reduced speeds the solid line Efficiency curve will be noted to rise in some proportion to the rise of the torque ratio on deceleration. During these decelerating conditions of hill climbing a point of direct clutch disengagement occurs which is preferably at 12 M. P. H. Release of the direct clutch 712 permits full converter action to resume and the Torque Ratio moves substantially vertically upwardly from the solid line to the dotted line typical converter characteristic curve shown at *g*. Correspondingly at this point the efficiency drops practically vertically downwardly to joint the typical converter efficiency curve shown at *h* and at vehicle speeds under the 12 M. P. H. point the high torques produced by the converter and the planetary are available to a maximum of 4.0:1 at stall speed. The stall torque position is shown at *i* on the graph of Figure 6. By way of return to the range of acceleration ratios at high speeds on the graph of Figure 6 it will be noted that the straight fluid coupling action occurs substantially at a point *j* after which a straight 1:1 drive ratio is available through the mechanism within the combined converter and clutch housing C–1. Decided advantage is to be gained in this speed range if a gear ratio were still available at speeds greater than the speed corresponding to the point *j*. That is to say, a decided advantage would be realized according to a somewhat modified form of the planetary converter mechanism which would permit the straight torque multiplying gearing effect of the planetary gear set to be utilized for instance so as to approach the 1.6 torque ratio line shown by dotted lines at *k* in Figure 6.

Such modification is shown according to Figures 7, 8 and 9 wherein at variously available kickdown points such as *l*, *m* and *n* the underdrive planetary gear ratio may be realized to produce the efficient 1.6:1 gear multiplication indicated by the dotted line curve *k*.

Similarly to the combined converter and clutch housing C, C–1 of the embodiments of both Figure 1 and Figure 5 the modification of Figure 7 has a combined converter and clutch housing C–2 wherein a torque converter component 848 comprises a pump element 852, a primary or main turbine element 854, a turbo-stator element 860, and a reactor element 862. The main turbine 854 may be of the split compound type provided with a last stage set of vanes 856 secured as by a set of screws 858 to the first stage of the main turbine 854. Similarly to the embodiments of both Figure 1 and Figure 5, the pump element 852 of Figure 7 is directly connected to a power input shaft 816, and the turbo-stator element 860 is connected to a sun gear 886 forming one element of a planetary gear component. The main turbine element 854 is rotatably affixed to a ring gear or annulus 878 included in the planetary gear component. A set of pin carried planetary pinions 874 meshes with and orbits about the sun gear 886 and the ring gear 878, and is carried by a planetary gear carrier 870 appropriately splined at 871 for driving a driven shaft and forming the power output member of the planetary gear component. In similarity likewise to the embodiments of both Figure 1 and Figure 5, a splined sleeve 884 which carries the sun gear teeth 886 in Figure 7 is connected by means of a one-way sprag brake 890 to a case connected fixed hollow shaft 888. Another set of one-way sprag brake elements 896 connects the reactor 862 and the stationary shaft 888 in a one-way braking relationship. A direct clutch arrangement includes a clutch friction disk 812 arranged to be clamped between a relatively stationary clutch ring 808 and a relatively movable pressed steel clutch piston 898, the piston 898 being arranged to be pressurized and moved axially into clamping engagement under the influence of pressure fluid in a clutch or pressure chamber 868.

In similarity to the preceding embodiment of Figure 5 only, the modification of Figure 7 has the clutch disk 812 thereof provided with a spring loaded web and hub which is rotatably affixed at its inner periphery to a common set of ring gear splines 813 by means of which the hub of the web connected to the main turbine 854 is likewise connected to the ring gear 878 in the planetary gearing.

The clutch 812 is operated in the same fashion as the direct clutch 112 and 712 of Figures 1 and 5 and engages at or between the speeds of 15 and 55 M. P. H. as a joint function of throttle governed pressure and speed governed pressure. However, following engagement of the direct clutch 812 the converter fluid in the converter 848 continues to circulate counterclockwise along the mean path 850 of Figure 7 even though the pump element 852 and the main turbine element 854 are clutched against relative rotation with respect to one another. The drive into the planetary gear pinion 874 is therefore a split drive originating in part through the ring gear 878 with the remainder being fed in a path through the sun gear 886 from the turbo-stator element 860. The latter path contitutes a fluid slip drive connection the same as in the preceding embodiment of Figure 5 and accordingly a soft engagement at the clutch 812 is experienced as manifested at the time that the torque reaches the output carrier 870 splined at 871. A satisfactory torque split of 40%–60% for the split drive path of the embodiment of Figure 7 may be realized in the same manner as described previously in connection with the embodiment of Figure 5.

In similarity to the control arrangement of Figure 2 which is applicable to the principal embodiment of Figure 1, the modification according to Figure 7 has a control arrangement, Figure 9, comprising in essentials a throttle governed valve J–2 supplied from a line pressure header 944 and communicating with a modulating valve K–2. The modulating valve K–2 is likewise supplied from the common header 944. A direct drive shift valve M–2 is likewise supplied by the throttle governed valve J–2 jointly with a speed responsive governor L–2. By appropriate connections the modulating valve K–2 is placed in communication with a selector valve connected line 930 and the appropriate communicating lines thus far discussed specifically include a pair of series connected conduits 912, 915 between the header 944 and the throttle governed valve J–2, a pair of series connected conduits 912, 917 between the header 944 and the modulating valve K–2, a line 958 between the throttle governed valve J–2 and the modulating valve K–2, a line 982 between the governor L–2 and the direct shift valve M–2, and a group of branches 924, 930 which are series connected to a line 926 between the valves K–2, M–2 and the selector valve connected line 930. The direct shift valve M–2 has an outlet line 934 connecting the same to a shaft contained direct clutch connected passage 936. The throttle valve J–2 has a plunger 902 connected to an accelerator pedal 904 through a series of three bell cranks and a fourth bell crank which controls the position of a shaft operated arm 928. The three bell cranks just noted are also connected to a throttle valve 914 contained in an induction conduit 916 leading to the fuel consuming engine 10. An appropriate rotating seal 935 is provided sealingly to connect the direct shift line 934 and the shaft contained passage 936.

The points of similarity between the embodiments of both Figures 1, 2 and 5 and the modification of Figures 7, 8, and 9 cease at this point of description and the latter modification is different in that a clutch C–3 is provided between the turbo-stator element 860 and the sun gear 886, a snap ring 903 is provided on the plunger 902 of the throttle valve J–2 to act as an overtravel limiting stop, a second throttle valve J–3 is provided between the accelerator linkage arm 928 and the throttle governed valve J-2, and the longitudinally extending passage 936 is formed in an intermediate shaft 864 which is drilled along another longitudinal axis to provide a parallel bore 937 forming a portion of a conduit establishing communication between the second throttle valve J-3 and the second clutch C-3.

The clutch C-3 just noted between the turbo-stator element 860 and the sun gear 886 includes a cup shaped part 885 formed integrally with the splined sleeve 884 and receiving in the radial gap therebetween an axially shiftable annular clutch piston 887. The clutch piston 887 is splined to the integral cup shaped part 885 immediately within the mouth of the latter and is peripherally sealed thereto at 889 adjacent the inner end of the splines, Figure 8, and is also sealed at a central location 891 to the sleeve proper 884. The axially separable splined together annular piston 887 and the cup shaped part 885 cooperate to define a pressurizable clutch chamber 893 which is supplied from a group of series connected passages 895 leading from the valve controlled passage 937 in the intermediate or rear input shaft 864. A ball bearing comprising a plurality of bell elements 897 rotatably mounts the turbo-stator element 860 upon the main sleeve 884 and has an outer race engaging the former and an inner race engaging the latter. A snap ring 899 prevents movement of the inner race to the right as viewed in Figure 8 relative to the sleeve 884. A pair of axially separated sleeve bearings 907 separates the sleeve 884 and the output carrier 870 for relative rotation with respect to one another.

The second throttle valve J-3 has a fluid tight case 909 in which a plunger 911 is sealably slidable. At an intermediate portion thereon, the plunger 911 carries a snap ring 913 which during movement of the plunger 911 to the rightward as viewed in Figure 9 engages and moves a spool valve 919 in the same direction against the opposition of a spool engaging helical spring 921 which seats on the right end wall of the valve case 909. Speed increasing movement of the accelerator pedal 904 is such as to cause counterclockwise rotation of the arm 928 and the consequent rightward movement of the valve plunger 911 which is shown connected thereto.

The plunger 911 is in turn connected in tandem to the throttle governor valve plunger 902 by means of a lost motion connection having an outer sleeve 923 of malleable metal threadably secured at one end to a set of threads formed on the adjacent end of the plunger 902. At its opposite end, the sleeve 923 is spun over a tubular guide 925 which slidably receives an intermediate portion of the adjacent end of the plunger 911 which has a laterally protruding disk 927 rigid therewith at its extremity. An interposed helical spring disposed between and engaging the guide 925 and the disk-like extremity 927 on the plunger 911 serves to keep the lost motion connection within the sleeve 923 under a spring pre-load and in retracted position. A lock nut 929 may be provided for preventing rotation of the sleeve 923 with respect to the threads on the plunger 902 in the throttle valve J-2.

A similarly constructed lost motion connection of the spring loaded type may be included in the throttle linkage section between the throttle 914 and the nearest bell crank to which it is shown connected and such similar spring loaded lost motion connection is diagrammatically illustrated by a block in Figure 9. The spring loaded lost motion connection 615 of the preceding embodiment of Figure 2 is of the same common construction.

The operation of the spring loaded lost motion connection within the sleeve 923 is such as to permit the plunger 911 in the second valve J-3 to assume an overtravel position corresponding to overtravel of the accelerator pedal 904 notwithstanding the fact of a contemporaneous engagement between the snap ring 903 and the valve case 918 of the valve J-2 so as to prevent assumption by the valve plunger 902 in the latter into an enforced kickdown position. Under these circumstances, the helical spring between the disk 927 and the guide 925 is partially or fully collapsed and permits the lost motion connection to accommodate the overtravel and elongate and relinquish its fully foreshortened or retracted position.

The valve case 909 of the second throttle valve J-3 has an inlet 931 which is supplied from the line pressure connected conduit 912 through the intermediary of a series connected restricting orifice 997 and a precalibrated one-way ball valve 939. The restriction 997 prevents an undue or sudden drop of pressure in the line pressure header 944 due to the flow of fluid therefrom and the calibrated ball valve 939 serves further to insure adequate pressure at all times at the inlet 915 for the first throttle valve J-2. An outlet 941 in the case of the second throttle valve J-3 is connected through a line 943 with the supply line 937 for the second clutch C-3. The inlet and outlets 931, 941 are longitudinally separated from one another in closely spaced adjacency, and in further longitudinally spaced apart arrangement there is provided a pair of vent line outlets 943 and 945 in the case 921 under control of the valve sleeve 919. The valve sleeve 919 has an annular groove 947 at the mid portion thereof which in the fully unactuated position of the valve sleeve serves to connect the inlet 931 and the outlets 931, 941 and thus pressurizes the clutch C-3. At the same time, an appropriate land adjacent one end of the spool valve 919 covers the vent 943 whereas the valve permits adequate breathing action through the vent 945 at the opposite end of the sleeve valve 919 in the vicinity of the snap ring 913. The helical spring 921 tends at all times to move the sleeve valve 919 toward its leftward fully unactuated position. The solid line intermediate position of the sleeve valve 919 indicated by solid lines in the second throttle valve J-3 in Figure 9 corresponds to the wide open position of the throttle 914 and the accelerator pedal 904. When the accelerator pedal 904 travels even farther and assumes its kickdown position of overtravel, the inlet 931 is closed by the valve sleeve 919 and the outlet 941 is connected to the vent 943 through the annular groove 947 on the sleeve valve 919. In such instance the clutch C-3 is vented and instantaneously becomes depressurized and the clutch piston 887 moves into a leftward solid line retracted position shown by solid lines in Figure 8. The retracted position is enforced through the action of a fairly strong helical spring 881 disposed between and continually biasing apart the turbostator element 860 and the clutch piston 887. In engaged position, however, of the clutch piston 887 a reversely flared friction surface thereon engages a cone shaped friction face 883 formed on the hub of the turbo-stator element 860 so as to prevent relative rotation. The bearing 897 and the snap ring 899 limit movement of the clutch piston 887 in its rightward movement from the solid line position shown in Figure 8. The supply line 937 to the clutch C-3 is connected to the outlet line 943 from the valve J-3 by means of a rotating seal 933 surrounding the intermediate shaft 864 in fluid tight relationship.

In the operation of the embodiment of Figures 7, 8, and 9 the direct clutch 812 functions to engage as previously noted at or between the speeds of 15 and 55 M. P. H. as a joint function of the opposed throttle governed and speed governed pressures effective on the direct shift valve M-2. Similarly to the embodiment of Figure 2, the governor actuated clutch disengaging function automatically occurs during slow down at a point at which the governor L-2 registers a speed corresponding to 12 M. P. H. vehicle speed. This latter circumstance represents the only situation under which the disengagement of the clutch 812 is effected.

A throttle kickdown effect is achieved solely through the action of the second valve J-3 inasmuch as the snap ring stop 903 on the plunger 902 in the first throttle valve J-2 renders the first throttle valve immune to any kickdown operation. While the accelerator pedal 904 is in its advanced position of kickdown, the plunger 911 and the valve sleeve 919 are held in their extreme rightward position within the valve J-3 of Figure 9, causing the clutch C-3 to be vented. Under all other circumstances the clutch C-3 is pressurized and the sun gear 886 and turbo-stator element 860 are directly coupled thereby to one another. Thus, under the condition of starting from a standstill condition, the clutch C-3 functions purely as brake holds the turbo-stator element 860 non-rotatable with respect to the sun gear 886, which in turn is held stationary by the one-way brake 890 in opposition to the reaction thrust in the planetary gearing. When released from one another due to disengagement of the clutch C-3, the turbo-stator element 860 moves independently of the sun gear 886 and is free to operate according to the dictates of the torque converter in a strict free wheeling action permitted by the ball bearing 897. The sun gear 886 on the other hand begins to function as a reaction member in the planetary gear set and immediately tends to lose speed in an attempt to reverse its direction of rotation. Reverse rotation is prevented however owing to the one-way brake 890 engaged between the sun gear 886 and the stationary shaft 888 and the sun gear acts as a fixed under drive establishing reaction member in the planetary gear set. Accordingly a 1.6:1 planetary gear reduction accompanied by a corresponding torque multiplication ratio is effectuated strictly through the operation of the planetary gearing. Though advantageous at the lower vehicle speeds as well, this effect is also advantageous when a passing gear ratio is required at a time at which the torque converter 848 within the housing C-2 is operating at a point of speed at which it has reverted to a straight fluid coupling action. It is to be borne in mind however that the provision of the last stage set of main turbine vanes 856 in the torque converter component 848 extends the range of torque amplification relatively high as compared to the range of torque converter amplification realized by converter units having fewer elements than the present converter 848.

Return movement of the accelerator pedal 904 and the plunger 911 from their overtravel positions into the normal throttle operating range causes the sleeve valve 919 under action of the spring 921 to follow the movement of the plunger 911 and restore the engagement in the clutch C-3. Thereafter the turbo-stator element 860 no longer free wheels but is clutched to and tends to drive the sun gear 886 in its capacity as a planetary gear drive member rather than as a strict under drive gear reaction member in the planetary gear set.

For a graphic understanding of the kickdown operation of the embodiment of Figures 7, 8, and 9 reference may be had by way of review to the points $l$, $m$, $n$ of Figure 6 which represent the substantially straight vertically upward transition from the lower Torque Ratio curve shown in solid lines to the 1.6:1 torque multiplication curve $k$ shown in dotted lines. A reversal of the direction arrows on the line $l$, $m$, and $n$ in Figure 6 will appropriately indicate the loss of gear ratio brought about by the re-engagement of the clutch C-3. It is to be particularly noted that the engagement and disengagement of the clutch C-3 and the positions of the points $l$, $m$, and $n$ on the Torque Ratio curve of Figure 6 are purely arbitrary in accordance with the desire of the driver and engagement or disengagement occur whenever the accelerator pedal 904 enters or leaves the overtravel position thereof.

The kickdown operation just described in connection with the clutch C-3 is substantially instantaneous in its action for the following reason. Immediately upon the venting of the throttle connected valve J-3 due to the throttle 904 assuming an overtravel position, the clutch spring 881 in the clutch C-3 causes the latter to disengage whereupon the everpresent gear reaction upon the sun gear 886 causes the sun gear forthwith to slow down and tend to reverse its direction of rotation. Reverse rotation of the sun gear 886 is immediately forestalled however owing to the instantaneous response of the motion responsive one-way sprag brake 890 which holds the sun gear 886 stationarily to the fixed case connected hollow shaft 888. Accordingly a direct gear underdrive through the planetary component within the combined converter and clutch housing C-2 occurs without the necessity for the hydraulic pressure engagement of either an appropriate clutch band or brake band as with conventional fully hydraulic planetary transmission arrangements wherein hydraulic time lag represents a finite factor in the cycle of operation. Such instantaneous action of course is of great benefit when a passing gear is needed without delay for accelerating the vehicle such as to overtake another vehicle in highway travel.

As herein disclosed a direct clutch is shown incorporated in the embodiments of Figure 1 at 112, Figure 5 at 712, and Figure 7 at 812. Also, the drawing of the embodiment of Figure 7 shows a pair of series connected throttle operated valves J-2, J-3 wherein only the latter valve is movable into a kickdown position, but self-evidently with the elimination of the snap ring 903 in the valve J-2 the valve J-2 as well as the valve J-3 is rendered capable of assuming a kickdown position so as to declutch the direct clutch 812 and restore action of the converter 848. In an effort to extend the multiplication range of the torque converters 48, 748 and 848 of the three embodiments disclosed with an attendant possible increase in stall torque amplification as well, the first stage primary turbine 54, 754 and 854 is split and compounded with a last stage set of vanes 56, 756 and 856 but indeed it is not essential to the invention that the last stage set of vanes be included and a simple four element converter of the known pump—main turbine—turbo-stator—reactor element type may be employed in the transmission shown.

Variations within the spirit and scope of the invention described are equally comprehended by the foregoing description.

What is claimed is:

1. In the combination of a throttle-operated fuel powered engine having a power driving shaft and a throttle controlling linkage positionable in a normal range of movement between first and second positions corresponding respectively to meager throttle and fully open throttle conditions and movable into an over travel position beyond said normal range of movement, and change speed mechanism operatively connected to the engine, a pressure operated control arrangement operatively connected to said mechanism and having means including control valving for controlling the latter, said change speed mechanism incorporating a common converter-and-clutch containing housing, planetary gearing within said housing having an input member, a power output member, and planet pinions mounted for rotation on the output member so as to mesh with and orbit about the input member, a fluid flow element forming a pump in the converter and connected to the power driving shaft, a main turbine element included in the converter and connected for movement with the input member in the planetary gearing, a sun gear meshed with the planet pinions, a secondary turbine and a reactor in the converter each having means for preventing reverse rotation thereof, a normally pressurized first clutch for coupling together the sun gear and the secondary turbine, a second clutch pressurizable to become engaged and clutch together the power driving shaft and at least one of the planetary input and output members for conjoint rotation therewith, the control valving in said pressure operated control arrangement including an abruptly operating part actuatable to cause said second clutch to be pressurized and to become engaged as aforesaid, fluid directing means for exerting an actuating force on said part that corresponds to magnitude of speed of the change speed mechanism, fluid directing means for exerting an opposing force on said part that corresponds to magnitude of throttle opening as determined by the position of said linkage in the normal range of movement aforesaid between the first and second positions, and means responsive to a position of over travel assumed by said linkage beyond said normal range of movement for venting the first clutch to release the sun gear from the secondary turbine in the converter.

2. In the combination of a throttle-operated fuel powered engine having a power driving shaft, a throttle controlling linkage positionable at least between first and second positions corresponding respectively to meager throttle and fully open throttle conditions, and change speed mechanism operatively connected to the engine, a pressure operated control arrangement operatively connected to said mechanism and having means including a control valve for controlling the latter, said change speed mechanism incorporating a common converter-and-clutch containing housing, planetary gearing within said housing having an input member, a power output member, and planet pinions mounted for rotation on the output member so as to mesh with and orbit about the input member, a fluid flow element forming a pump in the converter and connected to the power driving shaft, a main turbine element included in the converter and connected for movement with the input member in the planetary gearing, a sun gear meshed with the planet pinions, a secondary turbine and a reactor in the converter each having means for preventing reverse rotation thereof, a disengageable first clutch for disengageably coupling together the sun gear and the secondary turbine, a second clutch pressurizable to clutch together the power driving shaft and at least one of the planetary input and output members for conjoint rotation therewith, the control valving in said pressure operated control arrangement including an abruptly operating part actuatable to cause said second clutch to be pressurized and engaged, fluid directing means for exerting an actuating force on said part that corresponds to magnitude of speed of the change speed mechanism, and fluid directing means for exerting an opposing force on said part that corresponds to magnitude of throttle opening as determined by the position of said linkage between the first and second positions.

3. In the combination of a throttle operated engine having a power driving shaft and a throttle controlling linkage normally positionable to corresponding meager throttle and fully open throttle conditions and movable into an over travel position past the fully open throttle position, change speed mechanism operatively connected to the engine, a pressure operated control arrangement operatively connected to said mechanism to control the latter, said change speed mechanism incorporating a common converter and gearing containing housing, planetary gearing within said housing having an input member, a power output member, and planet pinions mounted for enmeshed rotation about the output member so as to mesh with and orbit about the input member, a fluid flow element forming a pump in the converter and connected to the power driving shaft, a main turbine element included in the converter and connected for movement with the input member in the planetary gearing, a sun gear meshed with the planet pinions, a secondary turbine and a reactor in the converter, means for preventing reverse rotation of the secondary turbine and the reactor, a pressure-engaged clutch between the sun gear and secondary turbine and under control of the pressure operated control arrangement and normally maintained by the latter in a position of engagement-maintaining pressurization for coupling together the sun gear and the secondary turbine, and means responsive to a position of over travel assumed by said linkage past fully open throttle position for venting the pressure-engaged clutch to release the sun gear from the secondary turbine in the converter.

4. In the combination of a throttle operated engine having a power driving shaft and a throttle controlling linkage normally positionable between first and second positions corresponding respectively to meager throttle and fully open throttle conditions and movable into an over travel position past the fully open second position, change speed mechanism operatively connected to the engine, a pressure operated control arrangement operatively connected to said mechanism and having control valving to control the latter, said change speed mechanism incorporating planetary gearing and a multiple element converter together having a common housing and each having a reaction element corresponding to the reaction element of the other, means for preventing reverse rotation of the two-named reaction elements, a normally pressurized first clutch for coupling together the two reaction elements, a second clutch pressurizable to become engaged and clutch together the power driving shaft and another element included in the planetary gearing and converter for conjoint rotation therewith, the control valving in said pressure operated control arrangement including a part actuatable to cause said second clutch to become pressurized and engaged, fluid directing means for exerting an actuating force on said part that corresponds to magnitude of speed of the change speed mechanism, first valve means for exerting an opposing force on said part that corresponds to magnitude of throttle opening as determined by the position of said linkage between the first and second poistions, and a throttle-connected second valve means having an interconnection with the first valve means and responsive to a position of over travel assumed by said linkage past fully open throttle position for venting the first clutch to release the two named reaction elements from one another in the gearing and converter, said interconnection including a spring loaded lost motion connection accommodating displacement of the linkage and the second valve means past fully open throttle position without attendant displacement of the first valve means past the corresponding fully open throttle position.

5. In combination, a throttle operated engine having a power driving shaft and a throttle controlling linkage normally positionable between first and second positions corresponding respectively to meager throttle and fully open throttle conditions and movable into an over travel position past the fully open second position, change speed mechanism operatively connected to the engine, a pressure operated control arrangement operatively connected to said mechanism and having control valving to control the latter, said change speed mechanism incorporating a common converter and clutch containing housing, planetary gearing within said housing having an input member, a power output member, and planet pinions mounted for enmeshed rotation about the output member so as to mesh with and orbit about the input member, a fluid flow element forming a pump in the converter and connected to the power driving shaft, a main turbine element included in the converter and connected for movement with the input member in the planetary gearing, a reaction gear in the gearing meshed with the planet pinions, a secondary turbine and a reactor in the converter, means for preventing reverse rotation of the reaction gear and the reactor, a normally pressurized first clutch for coupling together the reaction gear and the secondary turbine, a second clutch pressurizable to become engaged and clutch together the power driving shaft and the planetary input member for conjoint rotation therewith, the control valving in said pressure operated control arrangement including an operating part actuatable to cause said second clutch to become pressurized and engaged, fluid directing means for exerting an actuating force on said part that corresponds to magnitude of speed of the change speed mechanism, fluid directing means for exerting an opposing force on said part that corresponds to magnitude of throttle opening as determined by the position of said linkage between the first and second positions, and means responsive to a position of over travel assumed by said linkage past fully open throttle position for venting the first clutch to release the reaction gear from the secondary turbine in the converter.

6. In combination, a throttle operated fuel consuming engine having a power driving shaft and a throttle controlling linkage normally positionable to correspond with meager throttle and fully open throttle conditions and movable into an over travel position past the normal positions for throttle operation, change speed mechanism operatively connected to the engine, a pressure operated control arrangement operatively connected to said mechanism and having control valving to control the latter, said change speed mechanism incorporating a common converter and gearing containing housing, planetary gearing within said housing having an input member, a power output member, and planet pinions mounted for rotation about the output member so as to mesh with and orbit about the input member, a fluid flow element forming a pump in the converter and connected to the power driving shaft, a main turbine element included in the converter and connected for movement with the input member in the planetary gearing, a reaction gear in the planetary gearing meshed with the planet pinions, a secondary turbine and a reactor in the converter, means for preventing reverse rotation of the reactor, a normally pressurized first clutch for coupling together the reaction gear and the secondary turbine and means for preventing reverse rotation of one of the same, a second clutch pressurizable to become engaged and clutch together the power driving shaft and at least one of the planetary input and output members for conjoint rotation therewith, the control valving in said pressure operated control arrangement including an operating part actuatable to cause said second clutch to become pressurized and engaged, fluid directing means for exerting an actuating force on said part that corresponds to an operating characteristic of the change speed mechanism, fluid directing means for exerting an opposing force on said part that corresponds to an operating characteristic of the engine, and means responsive to a position of over travel assumed by said linkage past fully open throttle position for venting the first clutch to release the reaction gear from the secondary turbine in the converter.

7. In combination, a throttle operated engine having a power driving shaft and a throttle controlling linkage normally positionable between first and second positions corresponding respectively to meager throttle and fully open throttle conditions and movable into an over travel position past the fully open second position, change speed mechanism operatively connected to the engine, a pressure operated control arrangement operatively connected to said mechanism and having control valving to control the latter, said change speed mechanism incorporating a toroidally shaped housing, planetary gearing within said housing having an input member, a power output member, and planet pinions mounted for rotation about the output member so as to mesh with and orbit about the input member, a fluid flow element forming a torque converter pump in the housing and connected to the power driving shaft, an element forming a main turbine in the torque converter and connected for movement with the input member in the planetary gearing, a sun gear meshed with the planet pinions, a torque converter element forming a secondary turbine in the housing and directly coupled to the sun gear, means for preventing reverse rotation of the sun gear, a normally pressurized first clutch for coupling together the sun gear and the secondary turbine, a second clutch pressurizable to become engaged and clutch together the power driving shaft and at least one of the planetary input and output members for conjoint rotation therewith, the control valving in said pressure operated control arrangement including a part actuatable to an open position to cause said second clutch to become pressurized and engaged, fluid directing means for exerting an actuating force on and effecting the open position of said part with a force that corresponds to magnitude of speed of the change speed mechanism, fluid directing means for exerting an opposing force on said part that corresponds to magnitude of throttle opening as determined by the position of said linkage between the first and second positions, and means responsive to a position of over travel assumed by said linkage past fully open throttle position for venting the first clutch to release the sun gear from the secondary turbine element in the converter.

8. In the combination of a throttle operated engine having a power driving shaft and a throttle controlling linkage normally positionable between first and second positions corresponding respectively to meager throttle and fully open throttle conditions and movable into an over travel position past the fully open second position, change speed mechanism operatively connected to the engine, a pressure operated control arrangement operatively connected to said mechanism and having a control valving to control the latter, said change speed mechanism incorporating a common converter and clutch containing housing, a planetary gearing component within said housing having an input member, a power output member, and planet pinions mounted for rotation about the output member so as to mesh with and orbit about the input member, a torque converter element forming a fluid flow pump in the common housing and connected to the power driving shaft, a torque converter element forming a main turbine element included in the housing and connected for movement with the input member in the planetary gearing component, a reaction element in each of the converter and planetary gearing components and having means for preventing reverse rotation of at least one of the same, means forming a set of fluid flow guide vanes in the converter and having a one-way brake engageable therewith in one direction of rotation thereof, a normally engaged first clutch for coupling together the two-said reaction elements, a second clutch pressurizable to become engaged and clutch together the power driving shaft and at least one of the planetary input and output members for conjoint rotation therewith, the control valving in said pressure operated control arrangement including an operating valve part actuatable to open to cause said second clutch to become pressurized and engaged, fluid directing means for exerting a valve opening actuating force on said valve part that corresponds to magnitude of speed of the change speed mechanism, fluid directing means for exerting an opposing force on said valve part that corresponds to magnitude of throttle opening as determined by the position of said linkage between the first and second positions, and means responsive to a position of over travel assumed by said linkage past fully open throttle position for effecting disengagement of the first clutch to release the reaction elements from one another in the converter and planetary components.

9. In combination, a throttle operated engine having a power driving shaft and a throttle controlling linkage normally positionable between first and second positions corresponding respectively to meager throttle and fully open throttle conditions and movable into an over travel position past the fully opened second position, change speed mechanism operatively connected to the engine, a line pressure operated control arrangement operatively connected to said mechanism and having control valving to control the latter, said change speed mechanism incorporating a planetary gearing component and a multiple element converted component together having a common housing and each having a reaction element corresponding to the reaction element of the other component, means for preventing reverse rotation of at least one of the two named reaction elements, a normally pressurized first clutch for coupling together the two reaction elements, a second clutch pressurizable to become engaged and clutch together the power driving shaft and another element included in one component among the planetary gearing and converter components, the control valving in said line pressure operated control arrangement including first and second valve means for modulating line pressure, said second valve means operating to modulate line pressure in accordance with magnitude of speed of the change speed mechanism, a third valve part operable jointly by the modulating pressures from the first and second valve means to cause the second clutch to become pressurized and engaged, fourth throttle connected valve means having an interconnection to the first valve means and responsive to a position of over travel assumed by said linkage past the corresponding fully opened throttle position for venting the first clutch to release the two named reaction elements from one another in the gearing and converter components, said first valve means moving in accordance with the magnitude of throttle opening as determined by the position of said linkage between the first and second positions and said interconnection including a spring loaded lost motion connection accommodating displacement of the linkage and the fourth valve means past fully open throttle position without attendant displacement of the first valve means past the corresponding fully open throttle position.

10. In combination, a throttle operated engine having a power driving shaft and a throttle controlling linkage normally positionable between first and second positions corresponding respectively to meager throttle and fully open throttle conditions and movable into an over travel position past the fully opened second position, change speed mechanism operatively connected to the engine, a line pressure operated control arrangement operatively connected to said mechanism and having control valving to control the latter, said change speed mechanism incorporating a planetary gearing component and a multiple element converter component each having a reaction element corresponding to the reaction element of the other component, means for preventing reverse rotation of at least one of the two named reaction elements, a normally pressurized first clutch for coupling together the two reaction elements, a second clutch pressurizable to become engaged and clutch together the power driving shaft and another element included in one of the planetary gearing and converter components, the control valving in said line pressure operated control arrangement including first and second valve means for modulating line pressure, said second valve means operating to modulate line pressure in accordance with magnitude of speed of the change speed mechanism, a third valve part operable jointly by the modulating pressures from the first and second valve means to cause the second clutch to become pressurized and engaged, fourth throttle connected valve means having an interconnection to the first valve means and responsive to a position of over travel assumed by said linkage past the corresponding fully opened throttle position for venting the first clutch to release the two named reaction elements from one another in the gearing and converter components, said first valve means moving in accordance with the magnitude of throttle opening as determined by the position of said linkage between the first and second positions and said interconnection including a lost motion connection accommodating displacement of the linkage and the fourth valve means past fully open throttle position without attendant displacement of the first valve means past the corresponding fully open throttle position.

11. In combination, a throttle operated engine having a power driving shaft and a throttle controlling linkage normally positionable between first and second positions corresponding respectively to meager throttle and fully open throttle conditions and movable into an over travel position past the fully opened second position, change speed mechanism operatively connected to the engine, a line pressure operated control arrangement operatively connected to said mechanism and having control valving to control the latter, said change speed mechanism incorporating a planetary gearing component and a multiple element converter component together having a common housing and each having a reaction element corresponding to the reaction element of the other component, means for preventing reverse rotation of at least one of the two named reaction elements, a normally engaged first disengageable clutch for coupling together the two reaction elements, a second clutch pressurizable to become engaged and clutch together the power driving shaft and another element included in the planetary gearing and converter for conjoint rotation therewith, the control valving in said line pressure operated control arrangement including first and second valve means for modulating line pressure, said second valve means operating to modulate line pressure in accordance with an operating characteristic of the change speed mechanism, a third valve part operable jointly by the opposed modulated pressures from the first and second valve means to open to cause the second clutch to become pressurized and engaged when the modulated pressure from the second valve means prevails over the opposing modulated pressure, fourth throttle connected valve means having an interconnection to the first valve means and responsive to a position of over travel assumed by said linkage past fully open throttle position for causing disengagement of the first clutch to release the two named reaction elements from one another in the gearing and converter components, said first valve means moving in accordance with an operating characteristic of the engine as determined by the position of said linkage between the first and second positions and said interconnection including a spring loaded lost motion connection accommodating displacement of the linkage and the fourth valve means past fully open throttle position without attendant displacement of the first valve means past the corresponding fully open throttle position.

12. In combination, a throttle operated engine having a power driving shaft and a throttle controlling linkage normally positionable between first and second positions corresponding respectively to meager throttle and fully open throttle conditions and movable into an over travel position past the fully opened second position, change speed mechanism operatively connected to the engine, a line pressure operated control arrangement operatively connected to said mechanism and having control valving to control the latter, said change speed mechanism incorporating a planetary gearing component and a multiple element converter component together having a common housing and each having a reaction element corresponding to the reaction element of the other component, means for preventing reverse rotation of at least one of the two named reaction elements, a normally pressurized disengageable first clutch for coupling together the two reaction elements, a second disengageable clutch engageable to clutch together the power driving shaft and another element included in the planetary gearing and converter for conjoint rotation therewith, the control valving in said line pressure operated control arrangement including first and second valve means for modulating line pressure, said second valve means operated to modulate line pressure in accordance with magnitude of speed of the change speed mechanism, a third valve part operable by the difference between the modulating pressures from the first and second valve means to cause the second clutch to become engaged at the point at which the modulating pressure supplied by the second valve means has a prevailing difference over the modulating pressure from the first valve means, fourth throttle connected valve means having an interconnection to the first valve means and responsive to a position of over travel assumed by said linkage past fully open throttle position for venting the first clutch to release the two named reaction elements from one another in the gearing and converter components, said first valve means moving in accordance with the magnitude of throttle opening as determined by the position of said linkage between the first and second positions and said interconnection including a telescoping lost motion connection accommodating displacement of the linkage and the fourth valve means past fully open throttle position without attendant displacement of the first valve means past the corresponding fully open throttle position.

13. In combination, a throttle operated engine having a power driving shaft and a throttle controlling linkage normally positionable between first and second positions corresponding respectively to meager throttle and fully open throttle conditions and movable into an over travel position past the fully opened second position, change speed mechanism operatively connected to the engine, a pressurized fluid operated control arrangement operatively connected to said mechanism and having control valving to control the latter, said change speed mechanism incorporating a planetary gearing component and a multiple element converter component together having a common housing and each having a reaction element corresponding to the reaction element of the other component, means for preventing reverse rotation of at least one of the two named reaction elements, a normally pressurized first clutch for coupling together the two reaction elements, a second clutch pressurizable to become engaged and clutch together the power driving shaft and another element included in the planetary gearing and converter for conjoint rotation therewith, the control valving in said pressurized fluid operated control arrangement including first and second fluid supplied valve means for reducing the pressure of the pressurized fluid as supplied, said second valve means operating to reduce the supplied fluid pressure in accordance with magnitude of speed of the change speed mechanism, a third valve part operable jointly by the reduced pressures from the first and second valve means to cause the second clutch to become pressurized and engaged, fourth throttle connected valve means having an interconnection to the first valve means and responsive to a position of over travel assumed by said linkage past fully open throttle position for venting the first clutch to release the two named reaction elements from one another in the gearing and converter components, said first valve means moving in accordance with the magnitude of throttle opening as determined by the position of said linkage between the first and second positions and said interconnection including a spring loaded lost motion connection accommodating displacement of the linkage and the fourth valve means past fully open throttle position without attendant displacement of the first valve means past the corresponding fully open throttle position.

14. In combination, a throttle operated engine having a power driving shaft and a throttle controlling linkage normally positionable between first and second positions corresponding respectively to meager throttle and fully open throttle conditions and movable into an over travel position past the fully opened second position, change speed mechanism operatively connected to the engine, a line pressure operated control arrangement operatively connected to said mechanism and having control valving to control the latter, said change speed mechanism incorporating a planetary gearing component and a multiple element converter component together having a common housing and each having a reaction element corresponding to the reaction element of the other component, means for preventing reverse rotation of at least one of the two named reaction elements, a normally pressurized first clutch for coupling together the two reaction elements, a second clutch pressurizable to become engaged and clutch together the power driving shaft and another element included in the planetary gearing and converter for conjoint rotation therewith, the control valving in said line pressure operated control arrangement including first and second valve means for modulating line pressure, said second valve means operating to modulate line pressure in accordance with magnitude of speed of the change speed mechanism, a third valve part operable jointly by the modulating pressures from the first and second valve means to cause the second clutch to become pressurized and engaged, fourth throttle connected valve means having an interconnection to the first valve means and responsive to a position of over travel assumed by said linkage past fully open throttle position for venting the first clutch to release the two named reaction elements from one another in the gearing and converter components, said first valve means moving in accordance with the magnitude of throttle opening as determined by the position of said linkage between the first and second positions and said interconnection including an over travel providing connection accommodating displacement of the linkage and the fourth valve means past fully open throttle position without attendant displacement of the first valve means past the corresponding fully open throttle position.

15. In combination, a fuel consuming engine provided with a throttle control and having a power driving shaft, and change speed mechanism operatively connected to the engine and having a power output shaft, said change speed mechanism incorporating a planetary gearing component and a multiple element converter component together having a common housing and each having a reaction element corresponding to the reaction element of the other component, means for preventing reverse rotation of one of the two named reaction elements, there being means to interconnect the two reaction elements including two friction-engaging surfaces which when engaged directly couple the one reaction element to the other, said planetary gearing component including an input member, a pinion-carrying carrier forming an output member and connected to the power output shaft with the pinions thereof adapted to orbit about and mesh with the input member of the planetary gearing and with the reaction element thereof, vaned fluid flow means forming the pump of the converter and connected to the power driving shaft, a pump-driven element forming a vaned turbine in the converter and directly coupled to the input member of the planetary gearing, said converter including a set of reactor guide vanes having means for preventing the reverse rotation thereof, and means including throttle connected means for controlling disengagement of the two friction engaging surfaces to uncouple the reaction elements from one another whereby the one said reaction element causes the reverse motion preventing means to engage and hold the same stationary.

16. In combination, a fuel consuming engine having a throttle control and having a power driving shaft, and change speed mechanism operatively connected to the engine and having a power output shaft, said change speed mechanism incorporating a planetary gearing component and a multiple element converter component each having a reaction element corresponding to the reaction element of the other component, the two reaction elements in said components have means including two friction-engaging surfaces associated therewith which when engaged directly couple the converter reaction element to the other of the two reaction elements so as to prevent relative rotation, said other reaction element continuously tending to rotate in a reverse direction and having one-way brake means for engaging the same and preventing the reverse rotation thereof, said planetary gearing component including an input member, a pinion carrying carrier forming an output shaft and connected to the driven shaft with the pinions thereof adapted to orbit about and mesh with the input member and said other reaction element, vaned means forming the pump of the converter and connected to the driving shaft, vaned means forming a turbine element in the converter and directly coupled to the input member of the planetary gearing, said converter including a guide vane element having means preventing the reverse rotation thereof, and throttle connected means for controlling disengagement of the two friction engaging surfaces to cause the said other reaction element to become uncoupled from the converter reaction element and engaged by the one-way brake means.

17. In combination, a fuel consuming engine having a throttle control and having a power driving shaft, change speed mechanism operatively connected to the engine, said change speed mechanism incorporating a planetary gearing component and a multiple element converter component each having a reaction element corresponding to the reaction element of the other component with the reaction element in the planetary gearing continuously tending to rotate in a reverse direction due to gear reaction and the reaction element in the converter being drivable forwardly due to appropriate converter fluid flow, one-way brake means for engaging the planetary reaction element and preventing reverse rotation thereof, alternate brake-clutch means connected between the reaction elements including two friction-engaging surfaces which when engaged cause the converter reaction element to be held rotatably stationarily to the planetary reaction element when the latter is stationarily engaged against reverse rotation by the one-way brake means, and which when engaged cause the planetary reaction element to be held rotatably fast to the converter reaction element when the latter is fluid driven forwardly, said planetary gearing component including an input member, a pinion carrying carrier forming the output member of the gearing with the pinions thereof adapted to orbit about and mesh with the input member and the planetary reaction element, vaned means forming the pump of the converter and connected to the driving shaft, vaned means forming a turbine element in the converter and directly coupled to the input member of the planetary gearing, said converter including a set of reactor guide vanes having means preventing the reverse rotation thereof, and throttle connected means for controlling disengagement of the two friction engaging surfaces to release the reaction elements from one another in the converter and planetary components whereby the planetary reaction element is free to be independently fluid driven forwardly and the converter reaction element is independently held stationary against reaction by the one-way brake.

References Cited in the file of this patent

UNITED STATES PATENTS

| | | |
|---|---|---|
| 2,203,177 | Patterson | June 4, 1940 |
| 2,238,748 | Patterson | Apr. 15, 1941 |
| 2,293,358 | Pollard | Aug. 18, 1942 |
| 2,298,648 | Russell | Oct. 13, 1942 |
| 2,298,649 | Russell | Oct. 13, 1942 |
| 2,312,849 | Pollard | Mar. 2, 1943 |
| 2,322,251 | Pollard | June 22, 1943 |
| 2,578,450 | Pollard | Dec. 11, 1951 |
| 2,616,309 | Russell | Nov. 4, 1952 |
| 2,627,189 | McFarland | Feb. 3, 1953 |
| 2,629,265 | Dodge | Feb. 24, 1953 |
| 2,630,895 | McFarland | Mar. 10, 1953 |
| 2,640,373 | Jandasek | June 2, 1953 |
| 2,667,085 | Ackerman | Jan. 26, 1954 |
| 2,679,768 | Baule | June 1, 1954 |

FOREIGN PATENTS

| | | |
|---|---|---|
| 666,092 | Great Britain | Feb. 6, 1952 |
| 974,256 | France | Sept. 27, 1950 |
| 1,009,428 | France | Mar. 12, 1952 |
| 1,044,901 | France | June 24, 1953 |